(12) United States Patent
Fishman

(10) Patent No.: US 8,213,199 B2
(45) Date of Patent: Jul. 3, 2012

(54) MULTIPHASE GRID SYNCHRONIZED REGULATED CURRENT SOURCE INVERTER SYSTEMS

(75) Inventor: Oleg S. Fishman, Maple Glen, PA (US)

(73) Assignee: Alencon Acquisition Co., LLC., Plymouth Meeting, PA (US)

( * ) Notice: Subject to any disclaimer, the term of this patent is extended or adjusted under 35 U.S.C. 154(b) by 282 days.

(21) Appl. No.: 12/542,891

(22) Filed: Aug. 18, 2009

(65) Prior Publication Data

US 2009/0302686 A1 Dec. 10, 2009

Related U.S. Application Data

(63) Continuation-in-part of application No. 12/325,187, filed on Nov. 29, 2008, now Pat. No. 8,130,518, which is a continuation-in-part of application No. 12/032,910, filed on Feb. 18, 2008, now abandoned.

(60) Provisional application No. 60/991,544, filed on Nov. 30, 2007.

(51) Int. Cl.
*H02M 7/00* (2006.01)
(52) U.S. Cl. ........................................... 363/71; 307/82
(58) Field of Classification Search .................... 363/67, 363/71, 72, 95, 131; 307/82, 85–86
See application file for complete search history.

(56) References Cited

U.S. PATENT DOCUMENTS

| | | | | | |
|---|---|---|---|---|---|
| 4,953,071 | A | * | 8/1990 | Lipman | 363/72 |
| 5,065,303 | A | * | 11/1991 | Nguyen et al. | 363/40 |
| 5,682,303 | A | * | 10/1997 | Goad | 363/71 |
| 6,166,527 | A | * | 12/2000 | Dwelley et al. | 323/222 |
| 6,259,017 | B1 | * | 7/2001 | Takehara et al. | 307/82 |
| 6,340,851 | B1 | * | 1/2002 | Rinaldi et al. | 307/82 |
| 7,576,449 | B2 | * | 8/2009 | Becker et al. | 307/45 |
| 7,808,125 | B1 | * | 10/2010 | Sachdeva et al. | 307/82 |
| 8,130,518 | B2 | * | 3/2012 | Fishman | 363/71 |
| 2009/0102440 | A1 | * | 4/2009 | Coles | 323/271 |
| 2010/0283325 | A1 | * | 11/2010 | Marcianesi et al. | 307/82 |

* cited by examiner

*Primary Examiner* — Adolf Berhane
(74) *Attorney, Agent, or Firm* — Philip O. Post

(57) ABSTRACT

Power from the dc outputs of wind-generated power collection nodes is converted to ac power of suitable quality for injection into an electric power grid. Conversion is accomplished by current regulation of the dc outputs of the wind-generated power collection nodes to the input of each one of multiple inverters in a system, with each inverter outputting multiple phase currents that are out of phase with the multiple phase currents outputted from all other inverters in the system. The multiple phase currents from all of the inverters in a system are connected to the secondary windings of a phase transformation network that produces a three phase current output having a step-shaped waveform for injection into the electric power grid. Alternatively the dc input to each one of the multiple inverters may be a combination of the dc outputs of wind-generated power collection nodes and the dc outputs of solar photovoltaic power collection nodes.

36 Claims, 29 Drawing Sheets

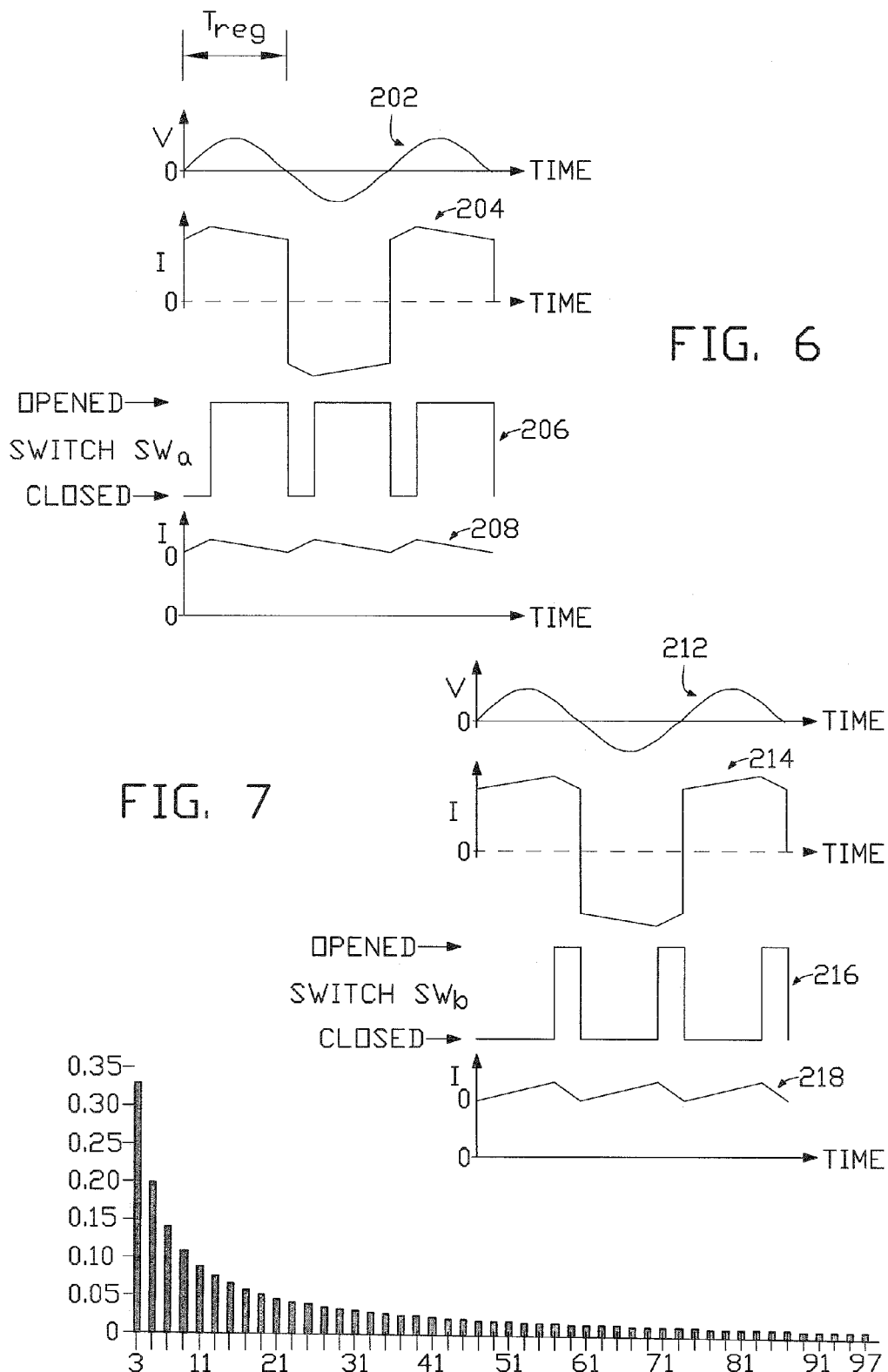

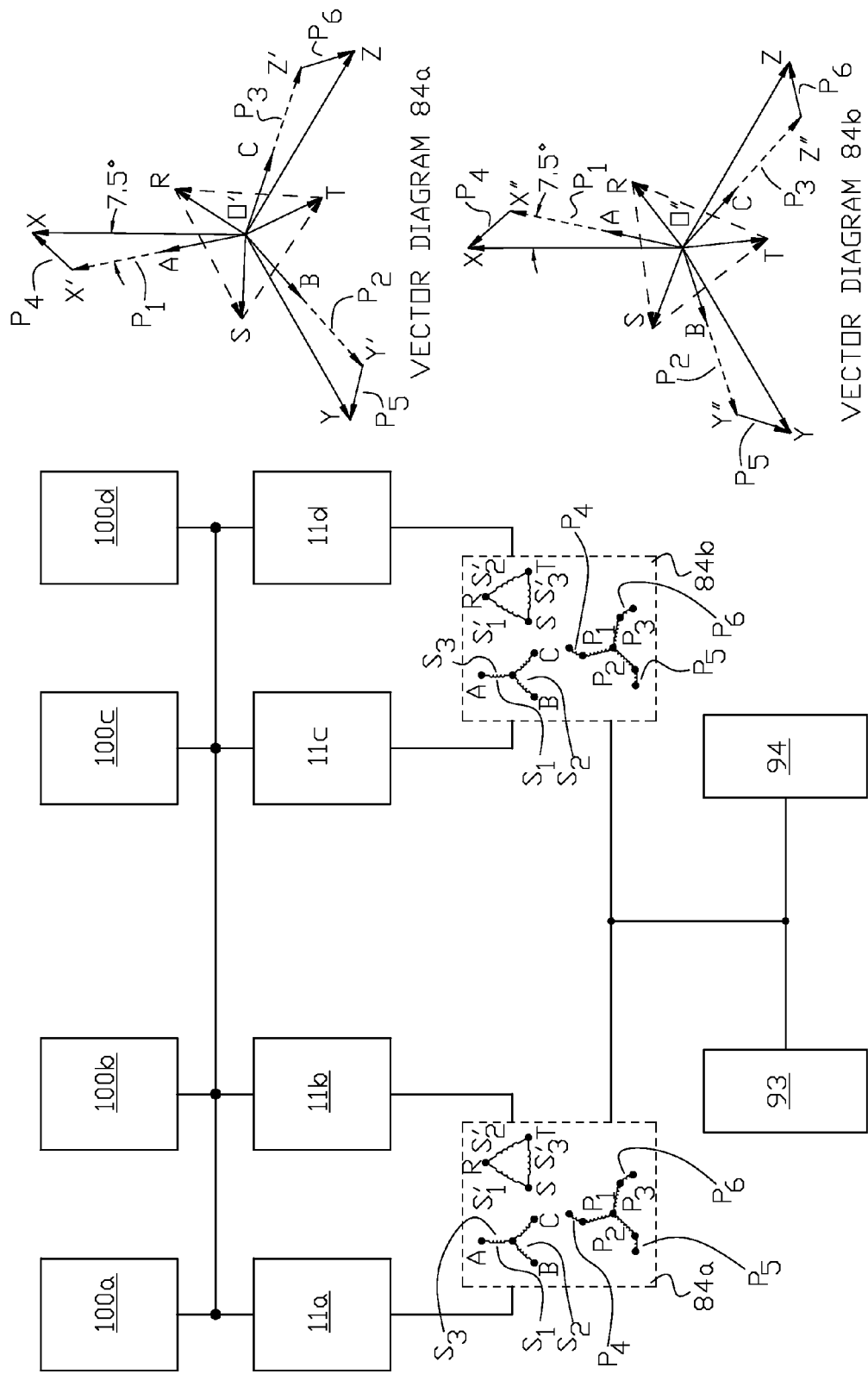

MULTIPHASE GRID SYNCHRONIZED REGULATED CURRENT SOURCE INVERTER SYSTEMS

CROSS REFERENCE TO RELATED APPLICATIONS

This application is a continuation-in-part of U.S. application Ser. No. 12/325,187 filed Nov. 29, 2008, which is a continuation-in-part of U.S. application Ser. No. 12/032,910 filed Feb. 18, 2008, which claims the benefit of U.S. Provisional Application No. 60/991,544, filed Nov. 30, 2007, all of which applications are incorporated herein by reference in their entireties.

FIELD OF THE INVENTION

The present invention relates to apparatus for, and method of, converting direct current (dc) power from a plurality of typically unstable sources to alternating current (ac) power that is of suitable quality for injection into an electric power grid where the plurality of unstable dc sources are the dc outputs from a plurality of wind turbine driven generator assemblies, or the dc outputs from a plurality of wind turbine driven generator assemblies in combination with the dc outputs from a plurality of photovoltaic power sources.

BACKGROUND OF THE INVENTION

Non-traditional renewable sources of power may be configured as cells, such as photovoltaic or fuel cells, to produce dc current across a potential difference. FIG. 1 diagrammatically represents a photovoltaic array 100 comprising a plurality of electrically connected photovoltaic modules 102, each one of which comprises a plurality of electrically interconnected photovoltaic cells. Although a three column by "n" row (where n can be any positive integer) is depicted in FIG. 1, the photovoltaic array may comprise any number of rows and columns of photovoltaic modules. For convenience a photovoltaic array is referred to as a "PVA." The PVA is a source of dc power (at output terminals +DC and −DC in FIG. 1) with performance characteristics graphically illustrated in FIG. 2. The voltage and current capacity of a PVA is a function of incident sunlight on the photovoltaic cells and their ambient temperature (site parameters). Additionally the level of current demand from the output of the PVA directly affects the magnitude of the dc output voltage. Curves 120a through 120e each represent change in PVA output current relative to a change in PVA output voltage for a particular type of photovoltaic cell and/or site parameters; curves 120a' through 120e' represent corresponding change in PVA output power relative to a change in PVA output voltage. As illustrated by the series of curves 120a through 120e, the current output gradually decreases as output voltage increases, until the maximum capacity of the PVA is reached for a given level of incident sunlight and ambient temperature. At that point in each current curve, the current output rapidly drops. Corresponding PVA power output is represented by the series of curves 120a' through 120e'; the PVA output power increases with voltage output to a point defined as the "maximum power point" (MPP), as defined by the intersection of dashed line MPP and each power curve in FIG. 2, and then rapidly drops. Therefore the desired optimum operating point for a power generating PVA is the MPP point.

Generally then, a PVA represents a dc source having a degree of unpredictability in terms of output stability since the output is a function of instantaneously uncontrollable factors such as the instantaneous level of incident sunlight or ambient temperature.

To deliver power in appreciable quantities from a PVA to a traditional power system (referred to as a "grid"), PVA dc output power must be converted to ac power at the grid frequency and phase synchronized with grid power. Alternative "power plants," such as a photovoltaic (solar) farm formed from a collection of photovoltaic arrays and dc-to-ac power converters, can have an electrical output capacity ranging from a few kilowatts to hundreds of megawatts. Solar farms are preferably built in regions with abundant sunlight, such as mountainous regions and deserts. Solar farms can also be built on roofs of high capacity power consumers, such as refrigerated storage facilities, industrial manufacturing plants, buildings housing banks of computer network servers, and shopping malls.

FIG. 3(a) shows a typical prior art, three phase, switch mode voltage source inverter 130. The inverter comprises three branches, each with two switching devices (SW1 and SW2; SW3 and SW4; or SW5 and SW6) in each branch. The switching device utilized in the switch mode voltage source inverter may be any type of controllable, unidirectional conduction semiconductor device, for example, a bipolar junction transistor (BJT); a metal-oxide-semiconductor field-effect transistor (MOSFET); an insulated-gate bipolar transistor (IGBT); a gate turn-off thyristor (GTO); or a gate commutated thyristor (GCT). Each switching device is shunted with an anti-parallel diode (D1 through D6). DC voltage input to the switch mode voltage source inverter is from PVA 100. Smoothing capacitor $C_{dc}$ stabilizes the input dc voltage while the dc current instantaneously changes through each half cycle of the inverter output frequency. The switching devices are modulated by sequentially switching them from the conduction (on) to non-conduction (off) states at a high rate of several kilohertz, so that the inverter output current, after passing through ac low pass filter 132, will be close to an ideal sinusoidal waveform. The inverter output current is then transformed through line transformer 134, which electrically isolates the inverter output from grid 92 and transforms the inverter output voltage level to the grid voltage level. Current supplied to the grid feeds load $R_{load}$ and, therefore, reduces the burden on grid power sources $V_{ac}$, which supply power through grid impedance $Z_{line}$.

The graphs in FIG. 4(a) through FIG. 4(c) describe the operation of the switch mode voltage source inverter shown in FIG. 3(a). A high frequency (typically 1,000 to 5,000 Hertz) saw tooth control signal represented by waveform 140 in FIG. 4(a) is compared with a sinusoidal reference signal represented by waveform 142, which is synchronized with the inverter output phase voltages. The waveforms illustrate one phase, for example phase A, while the other two phases, namely phases B and C, are identical except for a phase shift of plus and minus 120 degrees.

When the saw tooth signal's instantaneous magnitude is greater than the magnitude of the reference sinusoidal signal, positive switching device SW1 (connected to +DC rail) is conducting and negative switching device SW2 (connected to −DC rail) is non-conducting. At this instant a positive potential is applied to the inverter output phase. When the saw tooth signal's instantaneous magnitude is less than the magnitude of the sinusoidal reference signal, positive switching device SW1 is non-conducting and negative switching device SW2 is conducting. At this instant a negative potential is applied to the inverter output phase. Thus a high frequency pulse width modulated (PWM) train of voltage pulses represented by waveform 144 in FIG. 4(b) are generated on each inverter output phase.

For proper operation, the dc output voltage of the PVA must be at least equal to, or greater than, any peak value of the grid's phase voltages ($V_{an}$, $V_{bn}$ and $V_{cn}$) that are induced by the grid via transformer 134 onto inverter output phases A, B and C. To satisfy this condition, the amplitude of the generated saw tooth signal is equal to the amplitude of the generated reference sinusoidal signal. When the PVA dc output voltage is greater than the phase voltages, the amplitude of the reference sinusoidal signal is reduced below the peak saw tooth voltage and the PWM voltage is changed, thereby controlling the magnitude of the output current represented by waveform 146 in FIG. 4(c). When the PVA dc output voltage drops below peak phase voltages, the inverter controls cannot compensate for the low level dc, and the total harmonic content of the inverter output current becomes so great that inverter 130 is disconnected from the grid.

Switching devices SW3 and SW4 are controlled in a similar way, except that the sine wave control signal is shifted plus 120 degrees from that for phase A, so that the inverter output produces a plus 120 degrees-shifted phase B, PWM voltage and sinusoidal current; similarly for switching devices SW5 and SW6, the sine wave control signal is shifted minus 120 degrees from that for phase A, so that the inverter output produces a minus 120 degrees-shifted phase C, PWM voltage and sinusoidal current.

In the switch mode voltage source inverter, switching devices SW1 through SW6 are the only control elements responsible for the value and shape of the inverter output current supplied to the grid. They are switched (commutated) at a high rate, which requires high speed semiconductor devices that are limited in steady state current carrying capacity and power dissipation. Switching losses are the limiting factor for the amount of power that can be converted by this type of inverter. Although switch mode voltage source inverters are widely used in residential and some commercial solar power converters that are capable of generating power levels up to 500 kW, they are too small to be successfully used in multi-megawatt ranges needed for large solar farm customers. The main reason for maximum power limitation is the high frequency of commutation of switching devices SW1 through SW6 that contribute to significant power losses in the devices with limited capacity to dissipate these losses.

The above description of a three phase switch mode voltage source inverter may be implemented with various switching schemes that are based on a rigid dc voltage input and high frequency PWM commutation of the inverter switching devices.

Another embodiment of a plurality of unstable dc sources is the dc power nodes in a wind powered source of electrical energy. For example, the dc output of an ac to dc rectifier having an ac input from a synchronous generator utilized in a Type 4 industry designated wind turbine generator power system is an unstable dc source. FIG. 3(b) diagrammatically represents a typical Type 4 wind turbine generator power system. Wind turbine driven generator 210 comprises wind turbine WT with its output shaft suitably coupled to ac synchronous generator SG. The variable frequency, variable voltage output from the generator is supplied to (active or passive) rectifier 212 with the rectified output dc link supplied to dc to ac inverter 130. The output from the inverter is typically conditioned and injected into gird 92 as previously shown in FIG. 3(a). Generally the conversion from variable frequency, variable voltage ac to dc is accomplished local to the wind turbine. The combination of wind turbine WT, generator SG and rectifier 212 may be referred to as a wind turbine driven generator assembly 200, as shown in FIG. 3(b), or a wind-generated power collection node, and represents one unstable dc source in a plurality of unstable dc sources that is similar in many aspects to a photovoltaic unstable dc source (PVA) in a plurality of unstable dc sources, and consequently, subject to many of the same limitations described above.

It is one object of the present invention to convert dc power from a plurality of typically unstable dc sources with multiphase regulated current source inverters having multiphase transformed outputs that produce an ac output current with reduced total harmonic distortion for injection into an electric power grid.

It is another object of the present invention to convert dc power from the dc outputs of a plurality of wind turbine driven generator assemblies with multiphase regulated current source inverters having multiphase transformed outputs that produce an ac output current with reduced total harmonic distortion for injection into an electric power grid.

It is another object of the present invention to convert dc power from the combination of dc outputs of a plurality of wind turbine driven generator assemblies and the dc outputs of a plurality of photovoltaic power sources with multiphase regulated current source inverters having multiphase transformed outputs that produce an ac output current with reduced total harmonic distortion for injection into an electric power grid.

SUMMARY OF THE INVENTION

In one aspect, the present invention is a power conversion system for, and method of, converting dc power from a plurality of unstable dc sources to ac power for injection into an electric power grid. The dc power source may be wind power generated, or a combination of wind power and solar photovoltaic generated as further described below.

For a power conversion system of the present invention with conversion of dc power from a wind power generated source, at least one wind-generated power collection node is provided with the output of the collection node connected to multiple regulated current source inverters. Each inverter has a plurality of switching devices for producing a multiple phase ac output. The multiple phase ac output of each inverter operates synchronously with the voltages of the electric power grid. Commutation of the switching devices in each inverter is sequenced to produce multiple phase ac output currents from each inverter. The wind-generated power collection node may be at least one turbine driven ac generator having a rectified dc output. At least one transformer for phase shifting the multiple phase ac output currents from all of the inverters is provided to produce a supply of three-phase currents for injection into the electric power grid. Each of the three-phase currents has a multiple stepped waveform. Increasing the number of inverters in an embodiment of the present invention increases the number of multiple steps in the waveform of each of the three-phase current and decreases the total harmonic distortion of the three-phase currents.

For a power conversion system of the present invention with conversion of dc power from the combination of wind power generated and solar photovoltaic generated sources, the power conversion system can be similar to the system described in the previous paragraph with the addition of at least one solar photovoltaic power collection node. The solar photovoltaic power collection node can comprise at least one photovoltaic power source, such as photovoltaic array, that may also be referred to as a solar photovoltaic power collection node.

In some embodiments of the invention each inverter may also have a combination step-up and step-down pulsed dc current regulator that regulates the multiple phase ac output currents from each inverter in a series of successive regulation periods that may be synchronized with the period of the electric power grid and be less than the period of the electric power grid. In some embodiments of the invention a step-up pulsed dc current regulator may be provided at the output of each wind-generated power collection node, or at the outputs of each solar photovoltaic and wind-generated power collection node, to maintain the output from a power collection node at a regulated dc current level; in such embodiment of the present invention the inverters to which the power collection nodes are connected may have a step-down pulsed dc current regulator to regulate the multiple phase ac output currents from each inverter. In all embodiments of the invention various combinations of number of inverters and transformer configurations may be used to phase shift the multiple phase ac output currents from the inverters to produce the three-phase current for injection into the electric power grid.

The above and other aspects of the invention are further set forth in this specification and the appended claims.

BRIEF DESCRIPTION OF THE DRAWINGS

The appended drawings, as briefly summarized below, are provided for exemplary understanding of the invention, and do not limit the invention as further set forth in this specification:

FIG. 6 and FIG. 7 illustrate waveforms relevant to the operation of the single phase regulated current source inverter shown in FIG. 5;

FIG. 8 graphically illustrates magnitudes of ac current harmonics produced at the output of the single phase regulated current source inverter shown in FIG. 5;

FIG. 37 is a simplified schematic diagram of one example of a twelve phase regulated current source inverter system of the present invention utilizing dual zigzag, wye-delta-configured transformation of output power;

FIG. 38 illustrates vector group diagrams showing the relationships of transformation voltages for the twelve phase regulated current source inverter system shown in FIG. 37;

DETAILED DESCRIPTION OF THE INVENTION

The term "power grid" or "grid" is used herein to generally describe an ac power grid that is typically divided according to operating voltages. The grid comprises transmission (typically 161 to 765 kilovolts); subtransmission (typically 34.5 to 138 kilovolts); distribution (typically 4.16 to 24.94 kilovolts); and utilization sections (typically 120 to 600 volts). Depending upon the availability and selection of components, the multiphase grid synchronized regulated current source inverter systems of the present invention can be used to supply (inject) ac power into the grid in any of these operating sections, although the distribution section of a grid is preferred.

Figure 5:
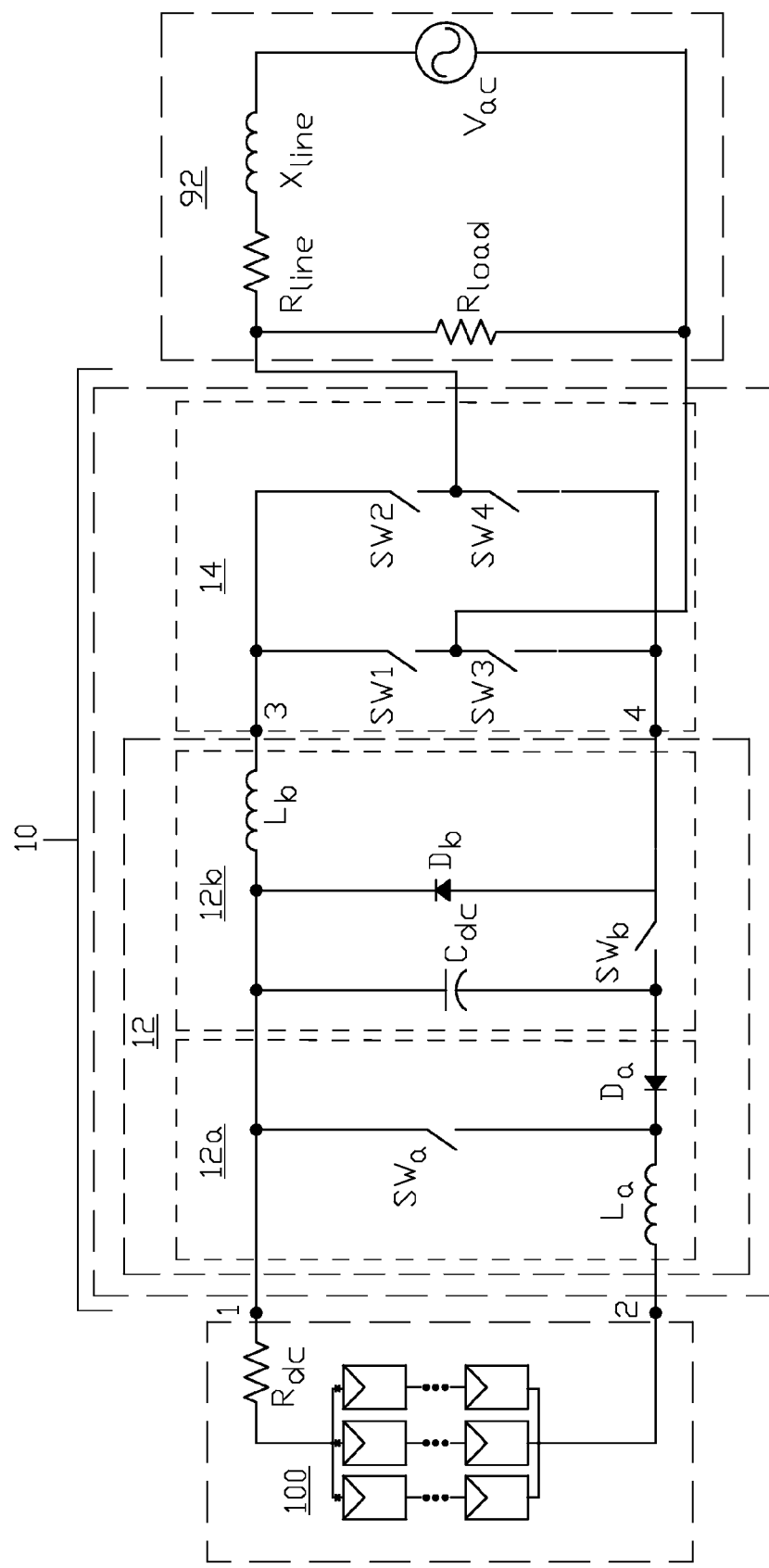
FIG. 5 is a simplified schematic diagram of a single phase regulated current source inverter illustrating dc current regulation used in the present invention.

FIG. 5 illustrates one example of the current regulation scheme that is used in the present invention, with single phase application, to simplify the description. In the figure, input power to regulated current source inverter (RCSI) 10 is from plurality of dc sources 100, which for the present illustration is PVA 100 as described above, but can also be a wind-generated power source as further described below. Lumped resistance $R_{dc}$ represents the internal series impedance of the PVA. RCSI 10 comprises current regulator (CR) section 12 and inverter section 14. In this particular example the CR section comprises subsections 12a and 12b, and the inverter section comprises a single phase dc-to-ac inverter. The inverter output is connected to an electric power network (grid) 92, which is represented in single line form as lumped line resistance $R_{line}$, line reactance $X_{line}$, and grid power sources $V_{ac}$. The inverter output injects power into the grid for use by loads connected to the grid (represented by $R_{load}$), thereby reducing power demand from the grid power sources.

CR subsections 12a and 12b are alternatively active depending upon whether the dc voltage input to the inverter (at points 3 and 4) is below or above an optimal value that facilitates injection of ac current into the grid as described below. CR section 12 regulates the instantaneous dc current level from source 100 so that a regulated dc current can be supplied to the inverter input independent of the stability of the output current from the PVA at the MPP as described above. CR subsection 12a serves as a step-up current regulator when the output voltage of dc source 100 that is inputted to the RCSI (at points 1 and 2) falls below the optimum voltage for the RCSI to output current for injection into grid 92. Step-up current regulator 12a is also sometimes referred to as a boost regulator. CR subsection 12b serves as a step-down current regulator when the output voltage of dc source 100 that is inputted to the RCSI (at points 1 and 2) rises significantly above the optimum voltage for the RCSI to output current for injection into grid 92. Step-up current regulator 12a is also sometimes referred to as a boost regulator. For an RCSI with a single phase inverter, this optimal voltage can be defined as a one-half period, average ac, line voltage (E) of the grid as represented by the following equation:

$$E = \sqrt{2} \cdot V_{line} \cdot \frac{2}{\pi} \qquad \text{[equation (1)]}$$

where E is the average dc voltage input to the single phase inverter (at points 3 and 4) and $V_{line}$ is the RMS line grid voltage. For example, if $V_{line}$ is equal to 600 volts, then from equation (1), optimal voltage, E, is equal to 540 volts.

The waveforms in FIG. 6 are relevant to the operation of the CR section of RCSI 10 in the step-up dc current regulation mode when step-up dc current regulator subsection 12a is active and step-down dc current regulator subsection 12b is not active (that is, switch $SW_b$ in subsection 12b is closed). The waveforms include grid line voltage waveform 202 and grid injected current waveform 204. During each regulation time period ($T_{reg}$), which is equal to one-half of the grid line voltage time period, switch $SW_a$ in FIG. 5 is closed for a switch $SW_a$ closed time period, and open for a switch $SW_a$ open time period as illustrated by waveform 206 in FIG. 6. When switch $SW_a$ is closed, inductor $L_a$ stores energy supplied by an increasing dc current as illustrated by the positive slope regions of waveform 208. When switch-$SW_a$ is open, stored energy in inductor $L_a$ flows to capacitor $C_{dc}$, as illustrated by the negative slope regions of waveform 208, to store charge energy in the capacitor. This arrangement allows inductor $L_a$ to charge capacitor $C_{dc}$ to a voltage level greater than the instantaneous inverter input dc voltage level and allows continuous operation of RCSI 10 defined by the MPP of PVA 100 when the instantaneous inverter input dc voltage level (at points 3 and 4) is below the optimal dc voltage input to the inverter. The current supplied to inverter 14 is controlled by the duty cycle ratio of the switch $SW_a$ closed time period to the switch $SW_a$ open time period or, in other words, by the amount of energy stored in, and discharged from, inductor $L_a$.

The waveforms in FIG. 7 are relevant to the operation of the CR section of RCSI 10 in the step-down dc current regulation mode when step-down dc current regulator subsection 12b is active and step-up dc current regulator subsection 12a is not active (that is, switch $SW_a$ in subsection 12a is open). The waveforms include grid line voltage waveform 212 and grid injected current waveform 214. During each regulation time period, $T_{reg}$, switch $SW_b$ in FIG. 5 is closed for a switch $SW_b$ closed time period and open for a switch $SW_b$ open time period as illustrated by waveform 216 in FIG. 7. When switch $SW_b$ is closed, inductor $L_b$ stores energy supplied by an increasing dc current as illustrated by the positive slope regions of waveform 218. When switch $SW_b$ is opened, stored energy in inductor $L_b$ flows through flywheel diode $D_b$ to control the average magnitude of dc current supplied to the input of inverter 14.

FIG. 6 and FIG. 7 are waveforms relevant to a single commutation of dc current regulator switch $SW_a$ and $SW_b$, respectively, in a regulation time period. In other examples of the present invention, either, or both of the switches can be commutated multiple times in a single regulation time period. Although multiple commutations per regulation period may increase switching losses, such operation may allow reduction of the size (both physical and electrical capacity) of regulator inductors $L_a$ and $L_b$ in a particular application, and therefore result in a net reduction in regulator losses.

In FIG. 5 inverter section 14 comprises four switching devices SW1 through SW4. Each switch may be any type of controllable, unidirectional conduction switching device, such as but not limited to: a bipolar junction transistor (BJT); a metal-oxide-semiconductor field-effect transistor (MOSFET); an insulated-gate bipolar transistor (IGBT); a gate turn-off thyristor (GTO); or a gate commutated thyristor (GCT). When a switch is not rated for high reverse voltage, for example, a BJT, IGBT or MOSFET, the switch may be connected in series with a blocking diode. Utilization of these types of switching devices in all examples of the invention has an advantage over prior art three phase inverters where three phase current grid-fed inverters are implemented with zero crossing silicon controlled rectifier (SCR) switching devices that can not be opened via gate control signals during any time in an electrical cycle. Consequently in these prior art inverters, SCR gate signals are delayed by 90 to 180 degrees from the timing sequence and allow current to flow from the dc source connected to the input of a RCSI and into the grid. These prior art inverters can not produce output current in phase with grid voltage. Also due to delayed zero crossing gating, the commutation of the inverter causes deep notches in the grid voltage that results in significant harmonic distortion.

Switch pair SW1 and SW4 are closed, and switch pair SW2 and SW3 are open during each positive half period of grid line voltage to allow positive polarity current to flow into the grid. Conversely, switch pair SW1 and SW4 are open, and switch pair SW2 and SW3 are closed during each negative half period of grid line voltage to allow negative polarity current to flow into the grid. Grid line voltage waveform 202 or 212 and inverter output current waveforms 204 and 214 are illustrated in FIG. 6 and FIG. 7.

Inductors $L_a$ and $L_b$ have sufficient electrical capacity to supply a substantially uninterrupted level of dc current to inverter 14, which results in a nearly square wave output current from the inverter as illustrated by waveforms 204 and 214. The harmonic content of a square wave can be calculated from the following equation:

$$\frac{I_n}{I_1} = \frac{1}{n} \qquad \text{[equation (2)]}$$

where $I_1$ is the amplitude of the first current harmonic and $I_n$ represents the current amplitude of the $n^{th}$ current harmonic. The value of integer, n, can be calculated from the equations:

$$n = 2 \cdot k \cdot \phi + 1 \text{ and } n = 2 \cdot k \cdot \phi - 1 \qquad \text{[equations (3a) and (3b)]}$$

where $\phi$ is equal to the total number of output phases for the one or more regulated current source inverters used in a particular application of the invention, and k is an integer ranging from one to infinity; in practice, the maximum value of k is selected when the next harmonic contributes an insignificant incremental value to the total distortion computed to the last previous harmonic. FIG. 8 is a bar chart illustration of the distribution of the relative magnitudes of the odd current harmonics produced by the output current from the single phase RCSI 10 in FIG. 5 (where $\phi$ equals 1 and n is equal to the series of integers: 3, 5, 7, 9, 11, 13 . . . 95, 97; that is, odd harmonics from the third to the ninety-seventh).

The total distortion of a given current waveform relative to a pure sine wave is quantified by a total harmonic distortion (THD) value in percent that can be calculated from the equation:

$$THD = \frac{\sqrt{\sum_{n=3}^{\infty}(I_n)^2}}{I_1} \qquad \text{[equation (4)]}$$

A square wave current waveform has a THD value of 48 percent, which is too large for injection into the grid, particularly at the distribution and utilization levels.

Figure 44:
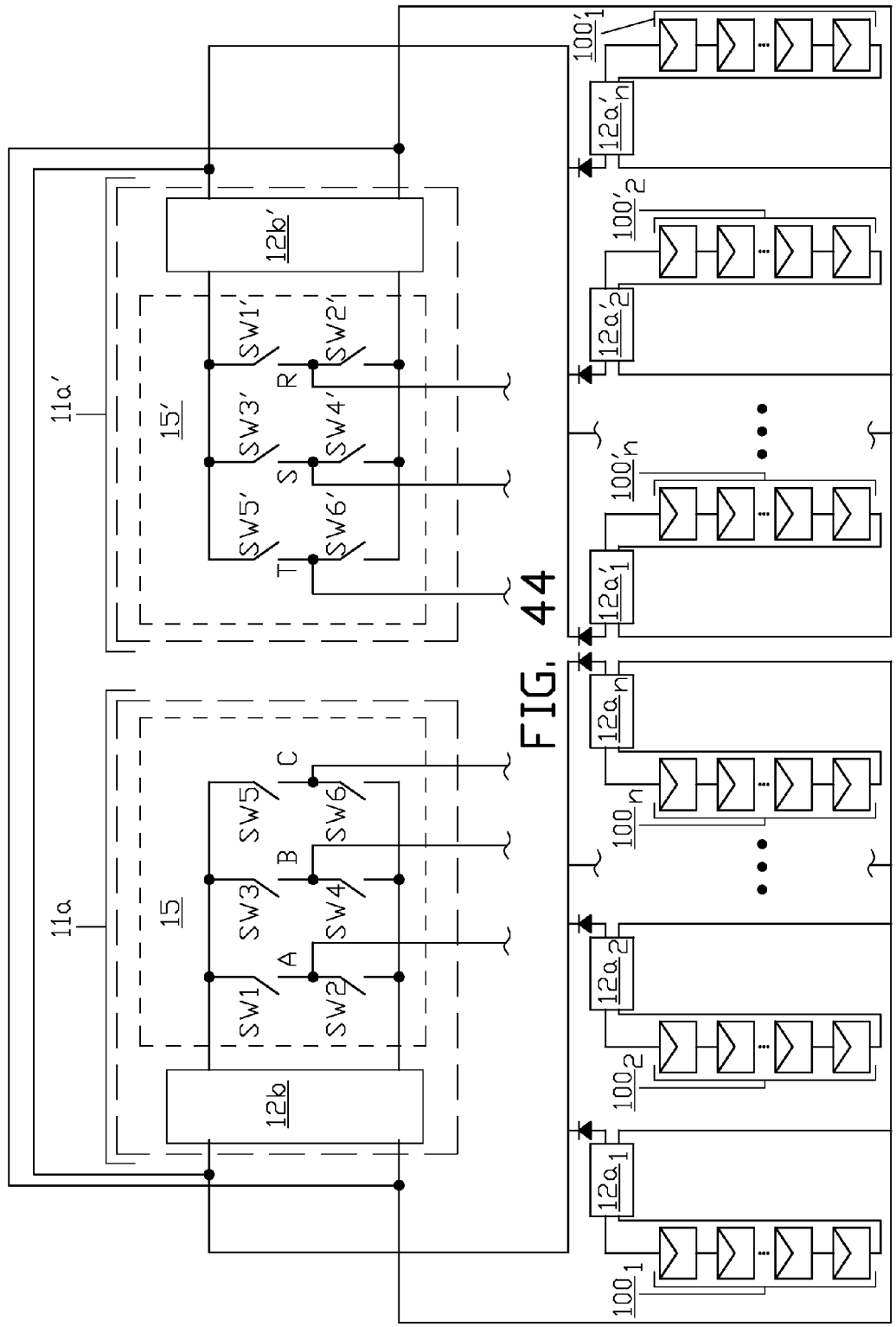
FIG. 44 is a simplified schematic diagram of another example of a regulated current source inverter system of the present invention wherein step-up current regulation is accomplished at the plurality of dc sources where all of the dc sources are photovoltaic power sources.

Referring to FIG. 5, in some examples of the invention, step-up current regulator (CR) subsection 12a can be removed from RCSI 10 if a step-up current regulator is provided at the output of each one of the plurality of dc sources connected to the input of RCSI 10. That is, if there are multiple dc sources 100 connected in parallel to the input of the modified RCSI without a step-up current regulator, they are connected directly to the input of step-down current regulator (CR) subsection 12b. FIG. 44 is one example of this alternative arrangement of the invention when there are two modified regulated current source inverters 11a and 11a'. Each one of plurality of dc sources $100_1$ through $100_n$ (where n is a positive integer), has a step-up current regulator ($12a_1$ through $12a_n$ respectively) at the output of each of the dc sources for input to modified RCSI 11. Similarly each one of plurality of dc sources $100_1'$ through $100_n'$, has a step-up current regulator ($12a_1'$ through $12a_n'$ respectively) at the output of each of the dc sources for input to modified RCSI 11a'. Each modified regulated current source inverter only has a step-down current regulator (12b or 12b'). With this alternative arrangement, there is voltage equalization at the output of each one of the multiple dc sources with improved MPP of each one of the multiple dc sources made up of a plurality of photovoltaic modules. This alternative arrangement of the invention can be applied to all examples of the invention disclosed below.

In the following examples of the invention, the term "primary" is used to refer to the windings of a transformer that are connected to the electric power grid, and the term "secondary" is used to refer to the windings of a transformer that are connected to the outputs of the regulated current source inverters used in the particular example of the invention.

Example No. 1

Figure 9:
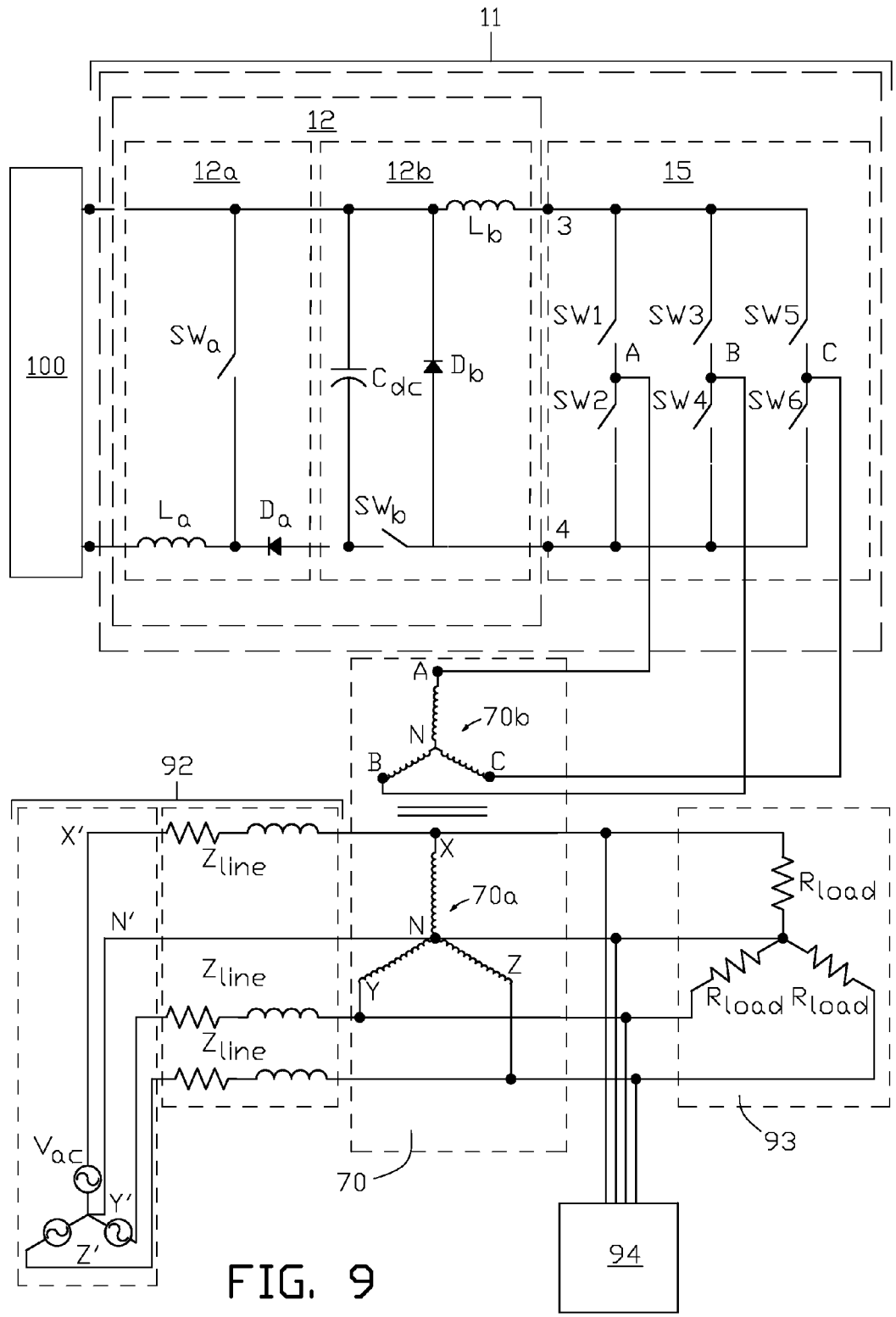
FIG. 9 is a simplified schematic diagram of one example of a three phase regulated current source inverter of the present invention.

FIG. 9 illustrates one example of a multiphase grid synchronized regulated current source inverter system of the present invention wherein RCSI 11 inverter section 15 outputs three phase power that undergoes a wye-wye transformation in transformer 70 before being injected into the grid. Regulator section 12 of the RCSI comprises step-up dc current regulator subsection 12a and step-down dc current regulator subsection 12b, which is supplied current from the plurality of dc sources 100 and outputs regulated dc current to the input (points 3 and 4) of three phase inverter 15. The ac outputs (labeled A, B and C in FIG. 9) of this inverter are connected to the wye-configured secondary windings 70b of transformer 70. The wye-configured primary windings 70a of transformer 70 are connected to three phase power grid 92. Grid 92 is schematically represented by lumped line impedances $Z_{line}$ and grid power sources $V_{ac}$. Current supplied to the grid feeds loads 93, which are connected to the grid and schematically represented as lumped load resistances $R_{load}$. One or more optional active filters 94 can be connected directly to the grid to inject high frequency current in opposite phase of the harmonic currents generated by the injected output current from the RCSI.

Figure 10:
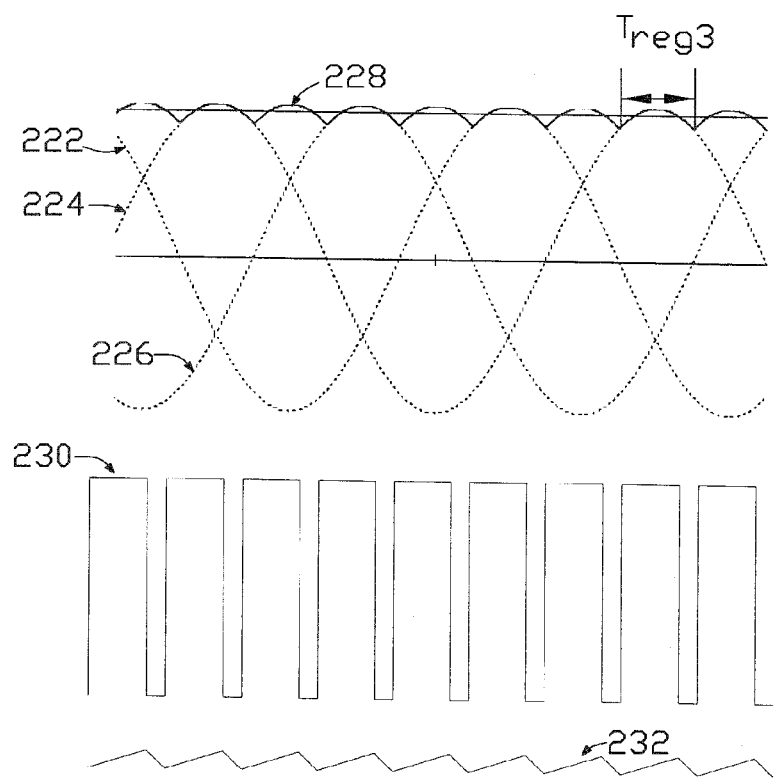
FIG. 10 and FIG. 11 illustrate waveforms relevant to the operation of the three phase regulated current source inverter shown in FIG. 9.

The waveforms in FIG. 10 are relevant to the operation of RCSI 11 shown in FIG. 9. Three grid phase voltages are represented by waveforms 222, 224 and 226. Relative to inverter 15 in FIG. 9, these waveforms correspond to phase voltages labeled X, Y and Z at primary windings 70a of transformer 70. Switching devices SW1 through SW6 are controlled to synchronize inverter output phases A, B and C with grid phase voltages X, Y and Z. When the grid phase voltage is positive, an appropriate number of odd numbered switching devices (SW1, SW3, SW5) are closed, and an appropriate number of even numbered switching devices (SW2, SW4, SW6) are open. Conversely when grid phase voltage is negative, an appropriate number of even numbered switching devices are closed, and an appropriate number of odd numbered switching devices are open.

Ripple voltage waveform 228 in FIG. 10 represents the voltage across the input (points 3 and 4) to inverter 15. A regulation period ($T_{reg3}$) for the three phase output RCSI 11 is equal to one ripple period, or one sixth of the grid's period (that is, inverted value of the grid frequency). The average value of dc voltage (E), which is the optimal voltage for controlling the required injected ac current into the grid can be determined from the following equation:

$$E = \frac{\sin(\frac{\pi}{6})}{\frac{\pi}{6}} \cdot \sqrt{2} \cdot V_{line} \quad \text{[equation (5)]}$$

where E is the average ripple dc voltage on the input terminals of the inverter and $V_{line}$ is the RMS grid phase voltage. For example, if $V_{line}$ on each of secondary windings 70b of transformer 70 is 2,400 volts ac, then from equation (5), optimal voltage, E, is equal to 3,240 volts dc.

Operation of dc current regulator section 12 for control of the dc current is as described above with reference to FIG. 6 and FIG. 7. The dc current regulator assures that nominal current can be supplied to the grid from the output of the RCSI when dc source 100 output voltage varies over a wide range, for example, if the source is a PVA and there are periodic changes in the amount of sunlight incident on the PVA, or if the source is a wind turbine driven generator assembly and there are periodic changes in wind velocity. Waveform 230 illustrates an example of switching the dc regulator and waveform 232 represents an example of dc input current to inverter 15 (at points 3 and 4).

Figure 11:
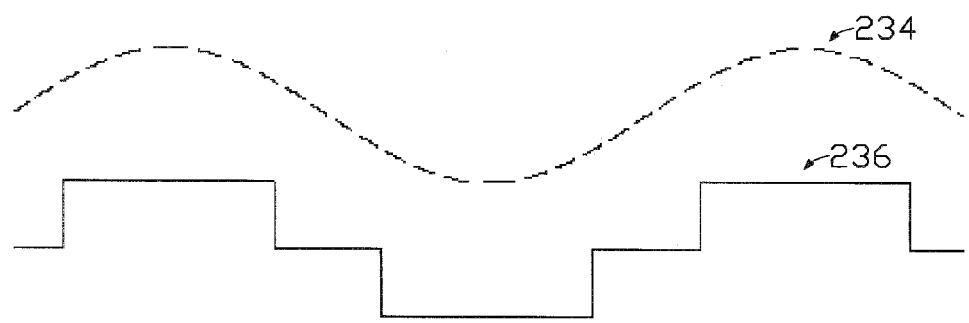

Waveforms 234 and 236 in FIG. 11 illustrate the instantaneous ac output voltage and current, respectively, from the three phase RCSI 11 shown in FIG. 9. Output current waveform 236, which is representative of current in phase A, B or C, is synchronized with a corresponding grid phase voltage as represented by waveforms 222, 224 or 226 in phase X, Y or Z, respectively.

The stepped current waveform 236 in each of secondary windings 70b are transformed into primary windings 70a to produce current injected in grid phases X, Y or Z, each of which is synchronized with a corresponding grid phase voltage X, Y or Z, respectively.

Figure 12:
FIG. 12 graphically illustrates magnitudes of ac current harmonics produced at the output of the three phase regulated current source inverter shown in FIG. 9.

The current represented by waveform 236 and outputted by three phase inverter 15 has an improved THD value over the current (waveforms 204 and 214 in FIG. 6 and FIG. 7) outputted by single phase RCSI 10 in FIG. 5. FIG. 12 is a bar chart illustration of the distribution of the relative reduced magnitudes of the odd harmonics produced by the output current from three phase RCSI 11 in FIG. 9 (where φ equals 3 and n is equal to the series of integers: 5, 7, 11, 13, 17, 19, 23, 25, . . . 95 and 97). The THD value of the three phase output current from RCSI 11 can be calculated from equation (4) as 30 percent.

The power generating capacity of a three phase RCSI system of the present invention is defined by the current rating of the inverter switches. For example, the type of switch may be an IGBT rated at 3,300 volts with a maximum current rating of 1,200 amperes. In this example, a three phase RCSI system rated at 2,400 volts ac with a dc source voltage of 3,240 volts dc is capable of generating 3.6 megawatts of power.

Example No. 2

Figures 13, 14:
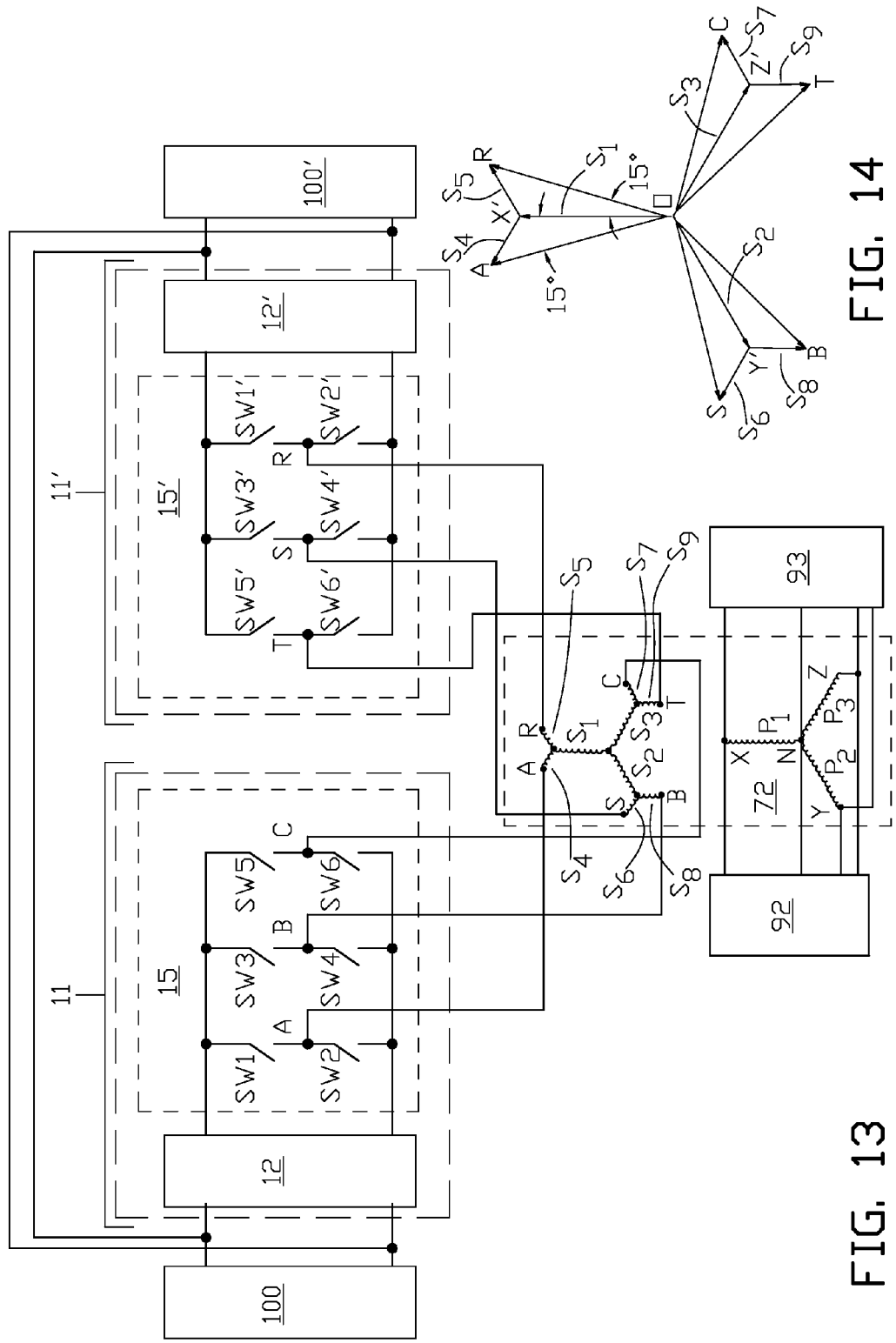
FIG. 13 is a simplified schematic diagram of one example of a six phase regulated current source inverter system of the present invention.
FIG. 14 illustrates a vector group diagram showing the relationships of transformation voltages for the six phase regulated current source inverter system shown in FIG. 13.

FIG. 13 illustrates another example of a multiphase grid synchronized regulated current source inverter system of the present invention wherein a six phase RCSI system has its output connected to transformer 72 that has branched wye-configured secondary windings. The six phase RCSI system comprises two, three phase regulated current source inverters 11 and 11', each of which is connected to the six phase secondary windings of transformer 72. First three phase RCSI 11 comprises dc current regulator section 12 and three phase inverter section 15, with plurality of dc sources 100 providing input dc power to RCSI 11. AC outputs A, B and C of inverter 15 are connected to terminals A, B, and C of the secondary windings of transformer 72 as shown in FIG. 13. Similarly second three phase RCSI 11' comprises dc current regulator section 12' and three phase inverter section 15', with plurality of dc sources 100' providing input dc power to the RCSI 11'. AC outputs R, S and T of inverter section 15' are connected to terminals R, S and T of the secondary windings of transformer 72. In order to achieve balanced dc voltage input to both inverters, the outputs of dc sources 100 and 100' are connected together in parallel as shown in FIG. 13. The wye-configured primary windings of transformer 72 are connected to three phase grid 92 and loads 93 in a manner similar to that described above relative to FIG. 9, including the optional addition of active line filters. Each three phase RCSI utilized in the six phase RCSI system of the present invention may be similar to the three phase RCSI shown in FIG. 9.

FIG. 14 is a vector group diagram representing the magnitude and relative phase relationships of voltages established by the output of the six phase RSCI system in the branched wye-configured secondary windings. For convenience, in all vector group diagrams, nomenclature used to label voltage vectors is the same as the nomenclature used to represent the inverter output and grid phases, and windings of the transformer in the corresponding schematic diagram; positive vector phase rotation is clockwise about origin O, with the term "lagging" referring to a vector following a referenced vector in the clockwise direction, and the term "leading" referring to a vector preceding a referenced vector in the clockwise direction. The vector group diagram in FIG. 14 illustrates a 30 degrees phase shift between voltage vectors R, S and T relative to voltage vectors A, B and C, respectively. Voltage vectors A, B and C lag grid voltage vectors X', Y' and Z' by 15 degrees, while voltage vectors A, B and C lead grid voltage vectors X', Y' and Z' by 15 degrees.

These phase shifts are explained by the construction of transformer 72. The three primary windings $P_1$, $P_2$ and $P_3$ are each wound around a separate magnetic core of transformer 72 to form a wye-configured arrangement, and are connected to grid phase terminals while the outputs of the inverter sections 11 and 11' are connected to the terminals of the secondary windings of the transformer. The secondary of transformer 72 has nine distinct windings. Three of these windings are referred to as "long" windings and six of the windings are referred to as "short" windings based upon the relative number of conductor turns making up each of these windings. That is, a long winding has a greater number of conductor turns than that of a short winding. In the present example, the ratio of turns between the long and short windings is approximately 2.73 to 1.0. The six secondary windings are interconnected to form a branched wye-configured connection. Likewise the voltage vectors in FIG. 14 representing voltages on the secondary of the transformer include nine distinct vectors. Three of these vectors are referred to as long vectors and six of these vectors are referred to as short vectors. The ratio of the magnitudes between the long and short vectors is also approximately 2.73 to 1.0.

Regarding vectors A and R, the secondary long stem winding $S_1$ is parallel to the primary winding $P_1$. Therefore windings $S_1$ and $P_1$ are wound around a common magnetic core. The secondary branch short winding $S_4$ is parallel to primary winding $P_3$. Therefore windings $S_4$ and $P_3$ are wound around a common magnetic core. The secondary short winding $S_5$ is parallel to the primary winding $P_2$. Therefore windings $S_5$ and $P_2$ are wound around a common magnetic core.

Referring to FIG. 14, vectors $S_4$ and $S_1$ sum to vector A (representing phase A voltage), which lags vector $S_1$ by 15 degrees. Similarly, vectors $S_5$ and $S_1$ sum to vector R (representing phase R voltage), which leads vector $S_1$ by 15 degrees. Voltage vectors A and R are shifted 30 degrees from each other, while each of these vectors are shifted 15 degrees, lagging and leading, respectively, relative to stem voltage vector X'.

Similarly voltage vectors B and S are shifted 15 degrees, lagging and leading, respectively, relative to stem voltage vector Y'; and voltage vectors C and T are shifted 15 degrees, lagging and leading, respectively, relative to stem voltage vector Z'. In summary, since stem and grid phases coincide, the three phase currents A, B and C outputted from RCSI 11 are lagging the grid phase voltages by 15 degrees and the three phase currents R, S and T outputted from RCSI 11' are leading the grid phase voltages by 15 degrees.

Further evaluation of the vector group shown in FIG. 14 and corresponding windings in FIG. 13 results in the arrangement of common core windings for transformer 72 shown in the following table.

| common core 1 | common core 2 | common core 3 |
|---|---|---|
| $P_1$ | $P_2$ | $P_3$ |
| $S_1$ | $S_5$ | $S_4$ |
| $S_8$ | $S_2$ | $S_6$ |
| $S_9$ | $S_7$ | $S_3$ |

Control of switches SW1 through SW6 in inverter section 11 are synchronized with phase voltages A, B and C, while the control of switches SW1' through SW6' in inverter section 11' are synchronized with phase voltages R, S and T. The output currents from the pair of inverters are summed and transformed to the primary windings of transformer 72 with no phase shift between the line voltages and currents.

Figure 15:
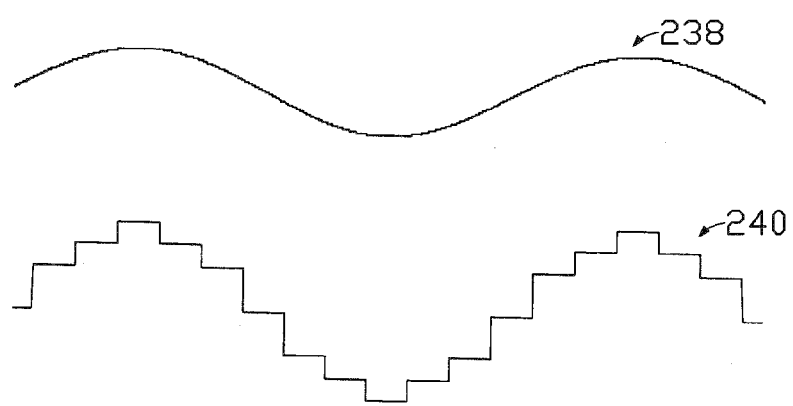
FIG. 15 illustrates waveforms relevant to the operation of the six phase regulated current source inverter shown in FIG. 13.

Waveforms 238 and 240 in FIG. 15 illustrate the instantaneous ac output voltage and current from the six phase RSCI system shown in the FIG. 13. Phase current represented by waveform 240, which is representative of phase current in grid phase X, Y or Z, is synchronized with corresponding phase voltage represented by waveform 238 in grid phase X, Y or Z.

Figure 16:
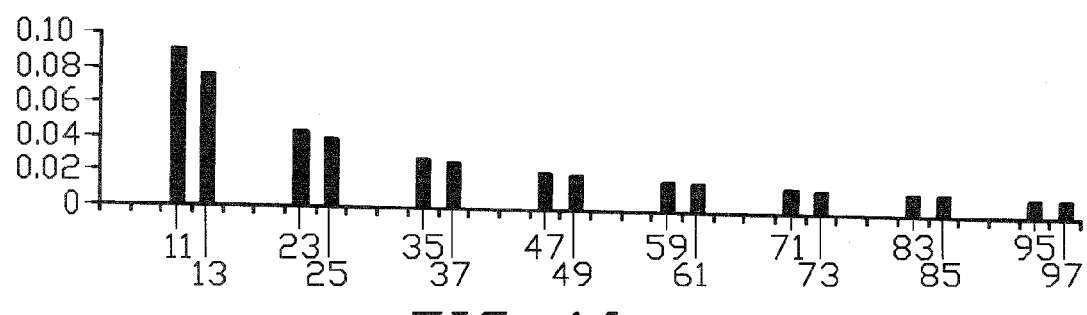
FIG. 16 graphically illustrates magnitudes of ac current harmonics produced at the output of the six phase regulated current source inverter shown in FIG. 13.

The bar chart in FIG. 16 illustrates the distribution of the relative magnitudes of the harmonic content of the current outputted by the six phase RCSI system with branched wye-configured transformer 72. The current harmonics are calculated from equation (2) with φ equal to 6 and n is equal to the series of integers: 11, 13, 23, 25 . . . 95 and 97, as defined for a six phase RCSI system. The THD of the six phase RCSI system can be calculated from equation (4) as less than 15 percent.

The power generating capacity of a six phase RCSI system of the present invention is defined by the current rating of the inverter switches. For example, the type of switch may be an IGBT rated at 3,300 volts with a maximum current rating of 1,200 amperes. In this example, a six phase RCSI system rated at 2,400 volts ac with a dc source voltage of 3,240 volts dc is capable of generating 7.2 megawatts of power. Due to low switching losses in the IGBT switches, the efficiency of the pair of inverters in the six phase RCSI system is approximately 98.5 percent. The inductive elements used in the dc current regulators are major contributors to the electrical losses. Using wiring that incorporates a high temperature superconductor (HTS) element for winding of the inductive elements can reduce these losses so that the overall system efficiency exceeds 99 percent. HTS elements may alternatively be used for winding of the inductive elements in any other application of the invention.

Example No. 3

Figures 17, 18:
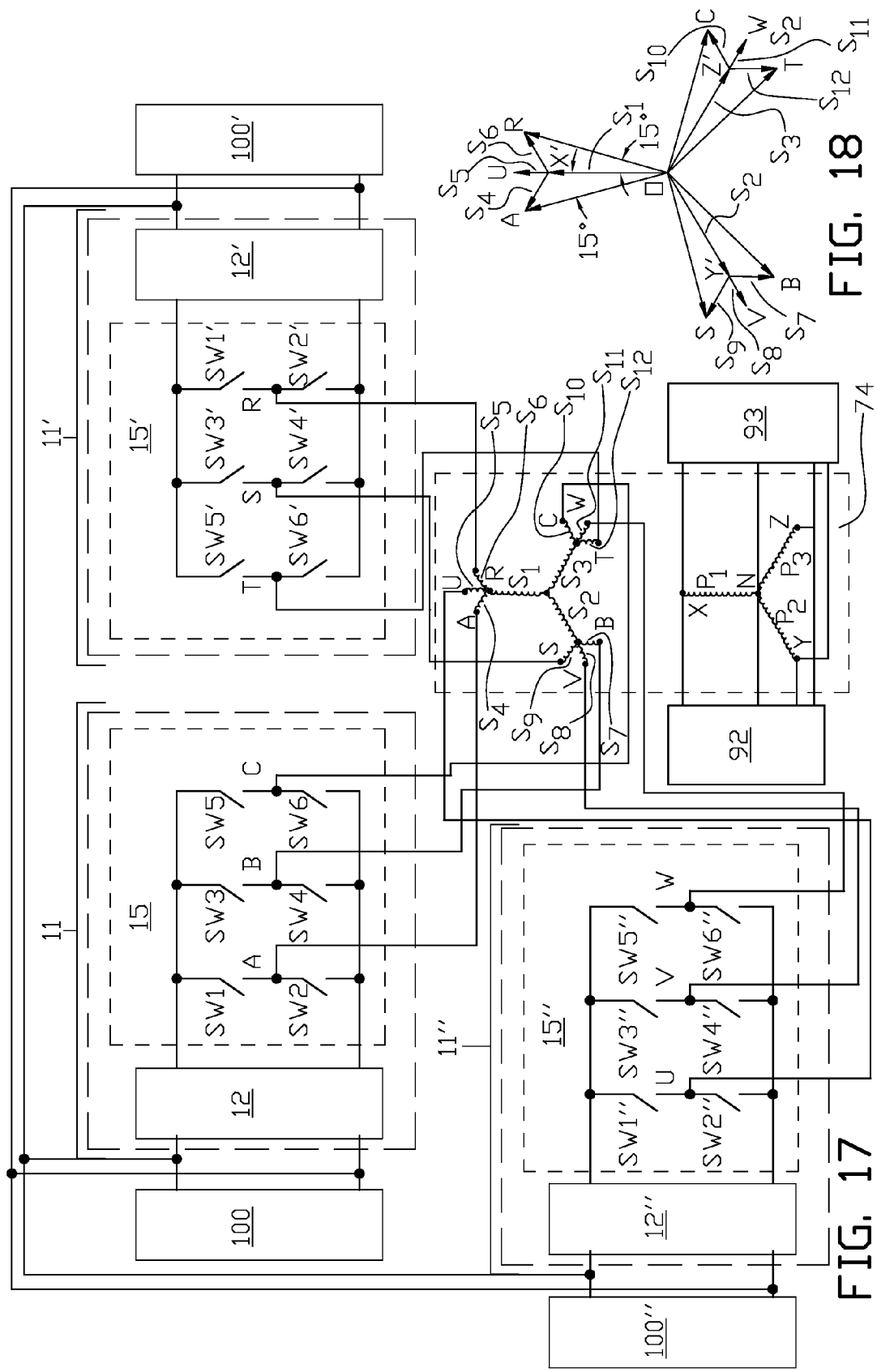
FIG. 17 is a simplified schematic diagram of one example of a nine phase regulated current source inverter system of the present invention utilizing branched wye-configured transformation of output power.
FIG. 18 illustrates a vector group diagram showing the relationships of transformation voltages for the nine phase regulated current source inverter system shown in FIG. 17.

FIG. 17 illustrates another example of a multiphase grid synchronized regulated current source inverter system of the present invention wherein a nine phase RCSI system has its output connected to transformer 74 that has branched wye-configured secondary windings. The nine phase RCSI system can be used to provide greater output power with a lower THD value than that achieved with the six phase RCSI system described above. The nine phase RCSI system comprises three, three phase RCSI 11, 11' and 11", each of which has its output connected to the nine phase secondary windings of transformer 74. First three phase RCSI 11 comprises dc current regulator section 12 and three phase inverter section 15, with plurality of dc sources 100 providing input dc power to RCSI 11. AC outputs A, B and C of inverter 15 are connected to terminals A, B, and C of the secondary windings of transformer 74 as shown in FIG. 17. Similarly second three phase RCSI 11' comprises dc current regulator section 12' and three phase inverter section 15', with plurality of dc sources 100' providing input dc power to the RCSI 11'. AC outputs R, S and T of inverter section 15' are connected to terminals R, S and T of the secondary windings of transformer 74. Similarly third three phase RCSI 11" comprises dc current regulator section 12" and three phase inverter section 15", with plurality of dc sources 100" providing input dc power to RCSI 11". AC outputs U, V and W of inverter section 15" are connected to terminals U, V and W of the secondary windings of transformer 74. In order to achieve balanced dc voltage input to all inverters, the outputs of dc sources 100, 100' and 100" are connected together in parallel as shown in FIG. 17. The wye-configured primary windings of transformer 74 are connected to three phase grid 92 and loads 93 similar to that described above relative to FIG. 9, including the optional addition of active line filters. Each three phase RCSI utilized in the nine phase RCSI system of the present invention may be similar to the three phase RCSI shown in FIG. 9.

In FIG. 17 the secondary of transformer 74 has three prong windings that extend from each phase stem winding. For example prong windings $S_4$, $S_5$ and $S_6$ extend from phase stem winding $S_1$. Similarly prong windings $S_7$, $S_8$ and $S_9$ extend from phase stem winding $S_2$, and prong windings $S_{10}$, $S_{11}$ and $S_{12}$ extend from phase stem winding $S_3$. All three phase stem windings each have approximately the same number of winding turns. The prong windings $S_4$, $S_6$ $S_7$, $S_9$ $S_{10}$, $S_{12}$ each have approximately the same number of winding turns, and the ratio of winding turns between each of these prong windings and a phase stem winding is approximately 2.73:1.0. Prong windings $S_5$, $S_8$ $S_{11}$ also have approximately the same number of winding turns, and the ratio of winding turns between each of these prong windings and a phase stem winding is approximately 4.54:1.0.

Referring to the vector group in FIG. 18, vectors $S_4$ and $S_1$ sum to vector A (representing phase A voltage), which lags vector $S_1$ by minus 15 degrees. Similarly, vectors $S_6$ and $S_1$ sum to vector R (representing phase R voltage), which leads vector $S_1$ by plus 15 degrees. Vectors $S_1$ and $S_5$ sum to vector U (representing phase U voltage), which is in phase with vector $S_1$. Therefore phase voltages A, U and R are phase related to grid stem voltage X' by minus 15 degrees, zero degrees, and plus 15 degrees.

Similarly inverter output phase voltages B, V and S are shifted relative to stem phase voltage Y' by minus 15 degrees, zero degrees, and plus 15 degrees; and phase voltages C, W and T are shifted relative to stem phase voltage Z' by minus 15 degrees, zero degrees, and plus 15 degrees. In summary, since stem and grid phases coincide, the three phase currents A, B, C outputted from RCSI 11 are lagging the grid phase voltages by minus 15 degrees; the three phase currents R, S and T outputted from RCSI 11' are leading the grid phase voltages by plus 15 degrees; and the three phase currents U, V and W are in phase with the grid phase voltages.

Further evaluation of the vector group shown in FIG. 18 and corresponding windings in FIG. 17 results in the arrangement of common core windings for transformer 74 as shown in the following table.

| common core 1 | common core 2 | common core 3 |
| --- | --- | --- |
| $P_1$ | $P_2$ | $P_3$ |
| $S_1$ | $S_2$ | $S_3$ |
| $S_5$ | $S_8$ | $S_{11}$ |
| $S_7$ | $S_6$ | $S_4$ |
| $S_{12}$ | $S_{10}$ | $S_9$ |

Control of switches SW1 through SW6 in inverter section 11 are synchronized with phase voltages A, B and C, while control of switches SW1' through SW6' in inverter section 11' are synchronized with phase voltages R, S and T, and control of switches SW1" through SW6" in inverter section 11" are synchronized with phase voltages U, V and W. The output currents from the triad of inverters are summed and transformed to the primary windings of transformer 74 with no phase shift between the phase voltages and currents.

Figure 19:
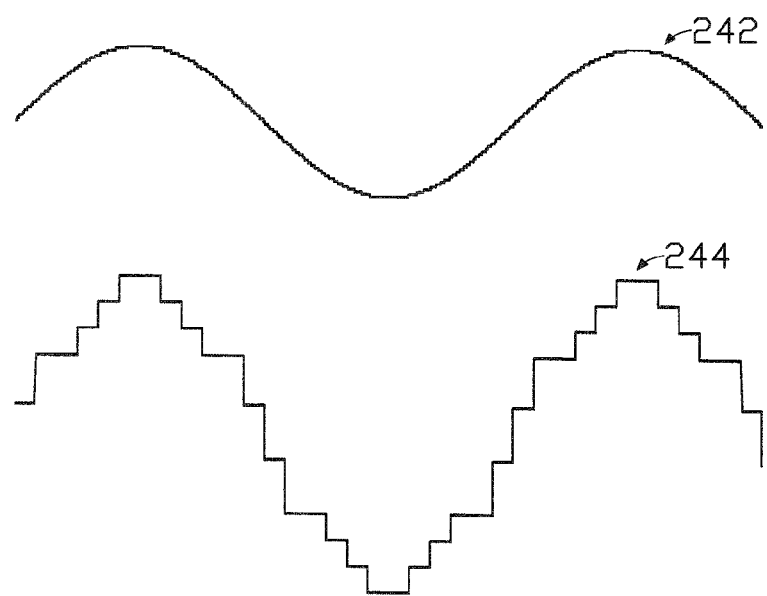
FIG. 19 illustrates waveforms relevant to the operation of the nine phase regulated current source inverter shown in FIG. 17.

Waveforms 242 and 244 in FIG. 19 illustrate the instantaneous ac output voltage and current from the nine phase RSCI system shown in FIG. 17. Phase current represented by waveform 244, which is representative of phase current in grid phase X, Y or Z, is synchronized with corresponding phase voltage represented by waveform 242 in grid phase X, Y or Z.

Figure 20:
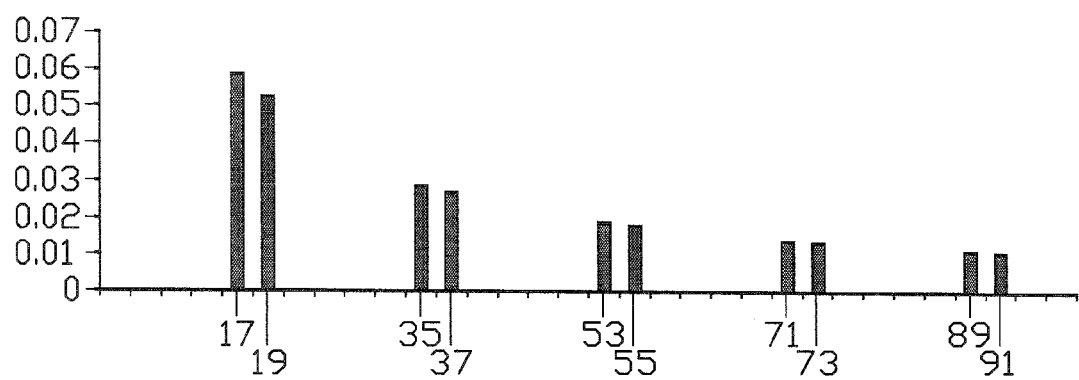
FIG. 20 graphically illustrates magnitudes of ac current harmonics produced at the output of the nine phase regulated current source inverter shown in FIG. 17.

The bar chart in FIG. 20 illustrates the distribution of the relative magnitudes of the harmonic content of the current outputted by the nine phase RCSI system with branched wye-configured transformer 74. The current harmonics are computed using equation (2) with φ equal to 9 and n equal to the series of integers: 17, 19, 35, 37, 53, 55, 71, 73, 89 and 91, as defined for a nine phase RCSI system. The THD value of the nine phase RCSI system can be calculated from equation (4) as less than 9.5 percent.

Applying the inverter switch ratings and system voltages from Example No. 2 above, the power generating capacity of the nine phase RCSI system shown in FIG. 17 can be calculated as 10.8 megawatts.

Example No. 4

Figures 21, 22:
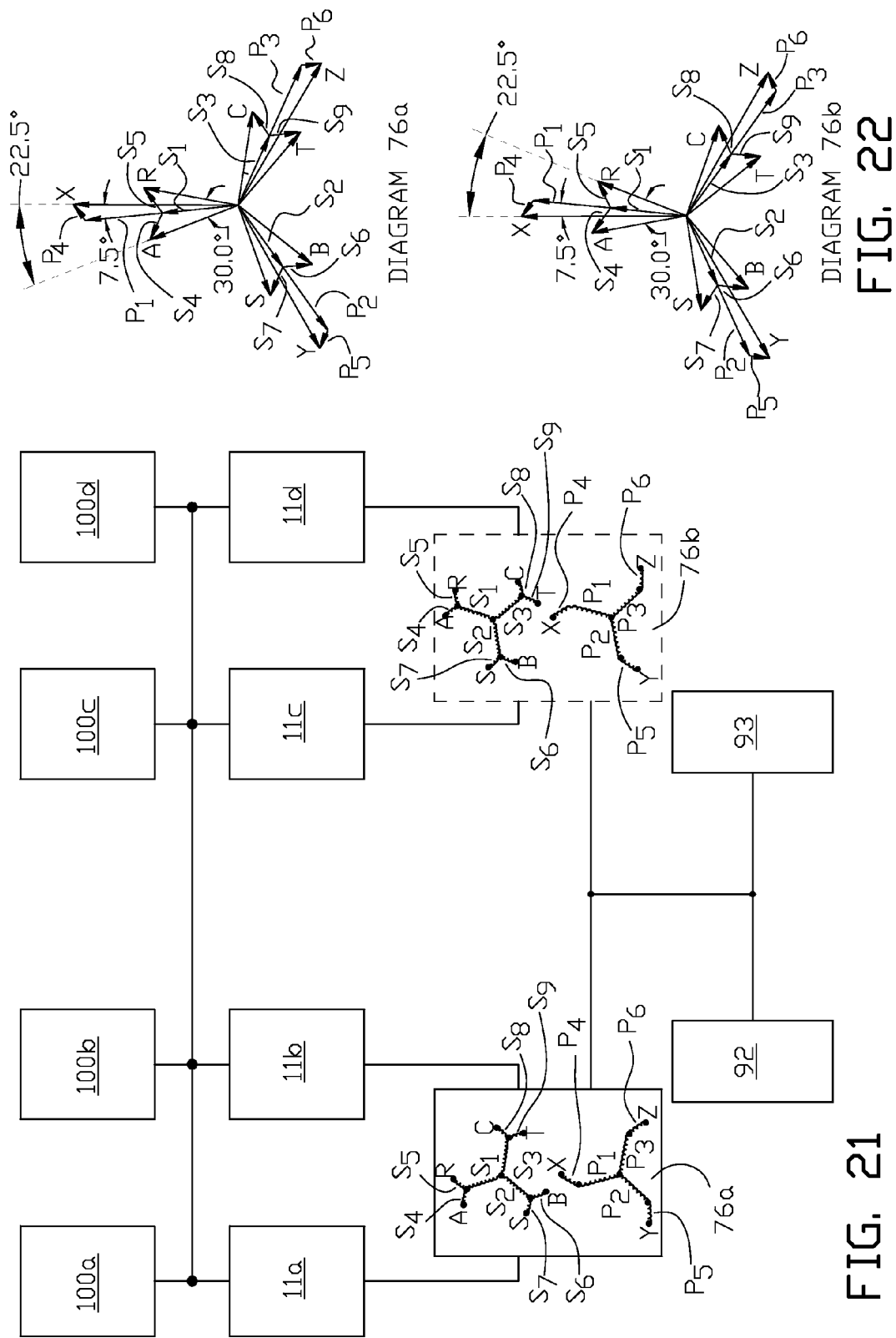
FIG. 21 is a simplified schematic diagram of one example of a twelve phase regulated current source inverter system of the present invention utilizing dual zigzag, branched wye-configured transformation of output power.
FIG. 22 illustrates vector group diagrams showing the relationships of transformation voltages for the twelve phase regulated current source inverter system shown in FIG. 21.

FIG. 21 illustrates another example of a multiphase grid synchronized regulated current source inverter system of the present invention wherein a twelve phase RCSI system comprises two pairs of regulated current source inverters (pair 11*a* and 11*b*; and pair 11*c* and 11*d*), with the outputs (phase A, B and C; and phase R, S and T) of each pair of inverters connected to the secondary windings of transformer 76*a* or 76*b*, which have branched wye-configured secondary windings and zigzag wye-configured primary windings. The twelve phase RCSI system can be used to provide greater output power with a lower THD value than that achieved by the previously described RCSI systems. The twelve phase RCSI system comprises four, three phase regulated current source inverters 11*a*, 11*b*, 11*c* and 11*d*, each of which may be similar to the three phase RCSI shown in FIG. 9. Plurality of dc sources 100*a*, 100*b*, 100*c*, and 100*d* are connected to the input of each RCSI as shown in FIG. 21. In order to achieve balanced dc voltage input to all inverters, the outputs of dc sources 100*a* through 100*d* are connected together in parallel as shown in FIG. 21. The outputs of inverter pair 11*a* and 11*b* are connected to the secondary windings of first six phase transformer 76*a*, and the outputs of inverter pair 11*c* and 11*d* are connected to the secondary windings of second six phase transformer 76b. The primary windings of each transformer are arranged in a zigzag configuration wherein each main primary winding, $P_1$, $P_2$ and $P_3$, has an extended shorter winding with different phase orientation than that of the associated main primary winding.

Vector group diagrams 76a and 76b in FIG. 22 illustrate voltages established in the corresponding windings of transformers 76a and 76b respectively. Referring to vector group diagram 76b, vectors $P_1$ and $P_4$ sum to vector X (representing grid phase X voltage). Vector $P_4$ is 180 degrees out of phase with vector $P_3$ and therefore, corresponding windings $P_3$ and $P_4$ are counterwound on the same magnetic core stack. The ratio of winding turns for winding $P_1$ to winding $P_4$ is approximately 4.92 to 1.0 so that vector $P_1$ leads vector X by 7.5 degrees. Since inverter output phase A voltage (represented by vector A) is connected to the secondary branch formed by the summation of vectors $S_1$ and $S_4$, phase A voltage will lag grid phase X voltage by 7.5 degrees. Inverter output phase R voltage (represented by vector R) leads inverter output phase A voltage by 30 degrees, and therefore, leads grid phase X voltage by 22.5 degrees. Similarly, inverter output phase B voltage (represented by vector B) is formed from the summation of vectors $S_2$ and $S_6$, and phase B voltage will lag grid phase Y voltage by 7.5 degrees, while inverter output phase S voltage (represented by vector S) leads inverter output phase B voltage by 30 degrees, and leads grid phase Y voltage (represented by vector Y) by 22.5 degrees; inverter output phase C voltage (represented by vector C) is formed from the summation of vectors $S_3$ and $S_8$, and phase C voltage will lag grid phase Z voltage by 7.5 degrees, while inverter output phase T voltage (represented by vector T) leads inverter output phase C voltage by 30 degrees, and leads grid phase Z voltage (represented by vector Z) by 22.5 degrees.

Further evaluation of the vector group shown in diagram 76b of FIG. 22, and corresponding windings in FIG. 21 results in the arrangement of common core windings for transformer 76b shown in the following table.

| common core 1 | common core 2 | common core 3 |
|---|---|---|
| $P_1$ | $P_2$ | $P_3$ |
| $P_5$ | $P_6$ | $P_4$ |
| $S_1$ | $S_2$ | $S_3$ |
| $S_6$ | $S_5$ | $S_4$ |
| $S_9$ | $S_8$ | $S_7$ |

Referring to vector group diagram 76a of FIG. 22, vectors $P_1$ and $P_4$ sum to vector X (representing grid phase X voltage). Vector $P_4$ is 180 degrees out of phase with vector $P_2$ and therefore, corresponding windings $P_2$ and $P_4$ are counterwound on the same magnetic core stack. The ratio of winding turns for winding $P_1$ to winding $P_4$ is approximately 4.92 to 1.0 so that vector $P_1$ lags vector X by 7.5 degrees. Since inverter output phase A voltage (represented by vector A) is connected to the secondary branch formed by the summation of vectors $S_1$ and $S_4$, phase A voltage will lag grid phase X voltage by 22.5 degrees. Inverter output phase R voltage (represented by vector R) leads inverter output phase A voltage by 30 degrees, and therefore, leads grid phase X voltage by 7.5 degrees. Similarly, inverter output phase B voltage (represented by vector B) is formed from the summation of vectors $S_2$ and $S_6$, and phase B voltage will lag grid phase Y voltage by 22.5 degrees, while inverter output phase S voltage (represented by vector S) leads inverter output phase B voltage by 30 degrees and leads grid phase Y voltage (represented by vector Y) by 7.5 degrees; and inverter output phase C voltage (represented by vector C) is formed from the summation of vectors $S_3$ and $S_8$, and phase C voltage will lag grid phase Z voltage by 22.5 degrees, while inverter output phase T voltage (represented by vector T) leads inverter output phase C voltage by 30 degrees and leads grid phase Z voltage (represented by vector Z) by 7.5 degrees.

Further evaluation of vector group diagram 76a as shown in FIG. 22, and corresponding windings in FIG. 21 results in the arrangement of common core windings for transformer 76a shown in the following table.

| common core 1 | common core 2 | common core 3 |
|---|---|---|
| $P_1$ | $P_2$ | $P_3$ |
| $P_6$ | $P_4$ | $P_5$ |
| $S_1$ | $S_2$ | $S_3$ |
| $S_6$ | $S_5$ | $S_4$ |
| $S_9$ | $S_8$ | $S_7$ |

Figure 23:
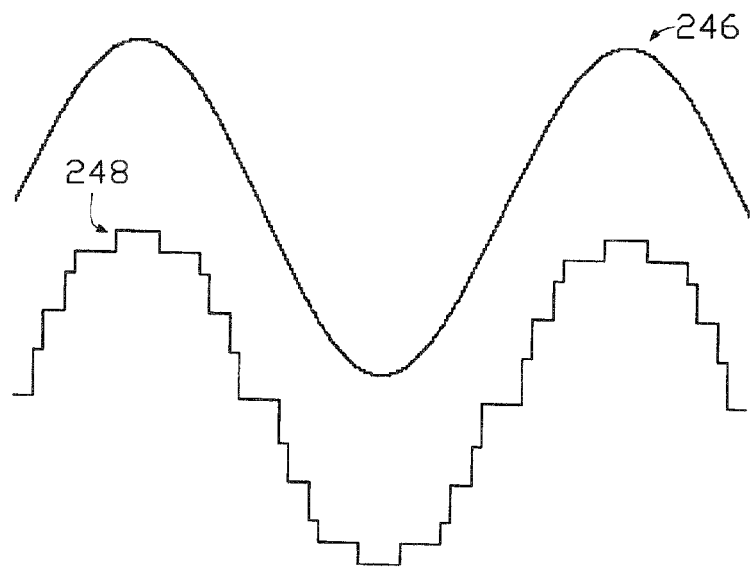
FIG. 23 illustrates waveforms relevant to the operation of the twelve phase regulated current source inverter shown in FIG. 21.

Therefore injected current to each grid phase for each output phase of the twelve phase RCSI system is the summation of four currents, namely currents leading and lagging each grid phase voltage by 7.5 and 22.5 degrees. This twelve phase RCSI system output current waveform 248 is in phase with output voltage waveform 246, and as illustrated in FIG. 23, is a better approximation of a pure sine wave than that in previous examples of the invention. The term "pure sine wave" is as used in the industry, namely a generated waveform that has a THD value generally less than 3 percent. Therefore the twelve phase grid synchronized RCSI system of the present invention comprising two pairs of three phase regulated current source inverters, with each pair connected to a zigzag wye-configured transformer having branched wye-configured secondary windings quadruples the magnitude of power that can be injected into the grid while reducing the current THD value over that achieved with a three phase RCSI system.

Figure 24:
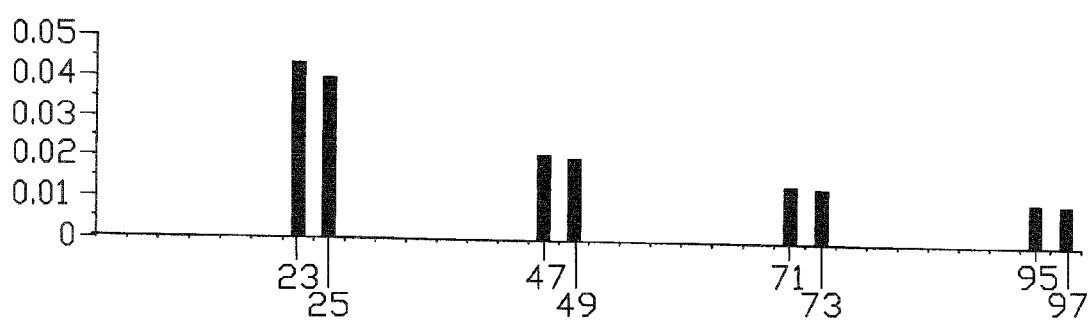
FIG. 24 graphically illustrates magnitudes of ac current harmonics produced at the output of the twelve phase regulated current source inverter shown in FIG. 21.

The bar chart in FIG. 24 illustrates the distribution of the relative magnitudes of the harmonic content of the current outputted by the twelve phase RCSI system with branched wye secondary and zigzag wye-configured primary transformation. The current harmonics are computed using equation (2) with $\phi$ equal to 12 and n equal to the series of integers: 23, 25, 47, 49, 71, 73, 95 and 97, as defined for a twelve phase RCSI system. The THD value of the twelve phase RCSI system can be calculated from equation (4) as less than 7 percent.

Applying the inverter switch ratings and system voltages from Example No. 2 above, the power generating capacity of the twelve phase RCSI system of the present invention shown in FIG. 21 can be calculated as 14.4 megawatts.

Example No. 5

Figures 25, 26:
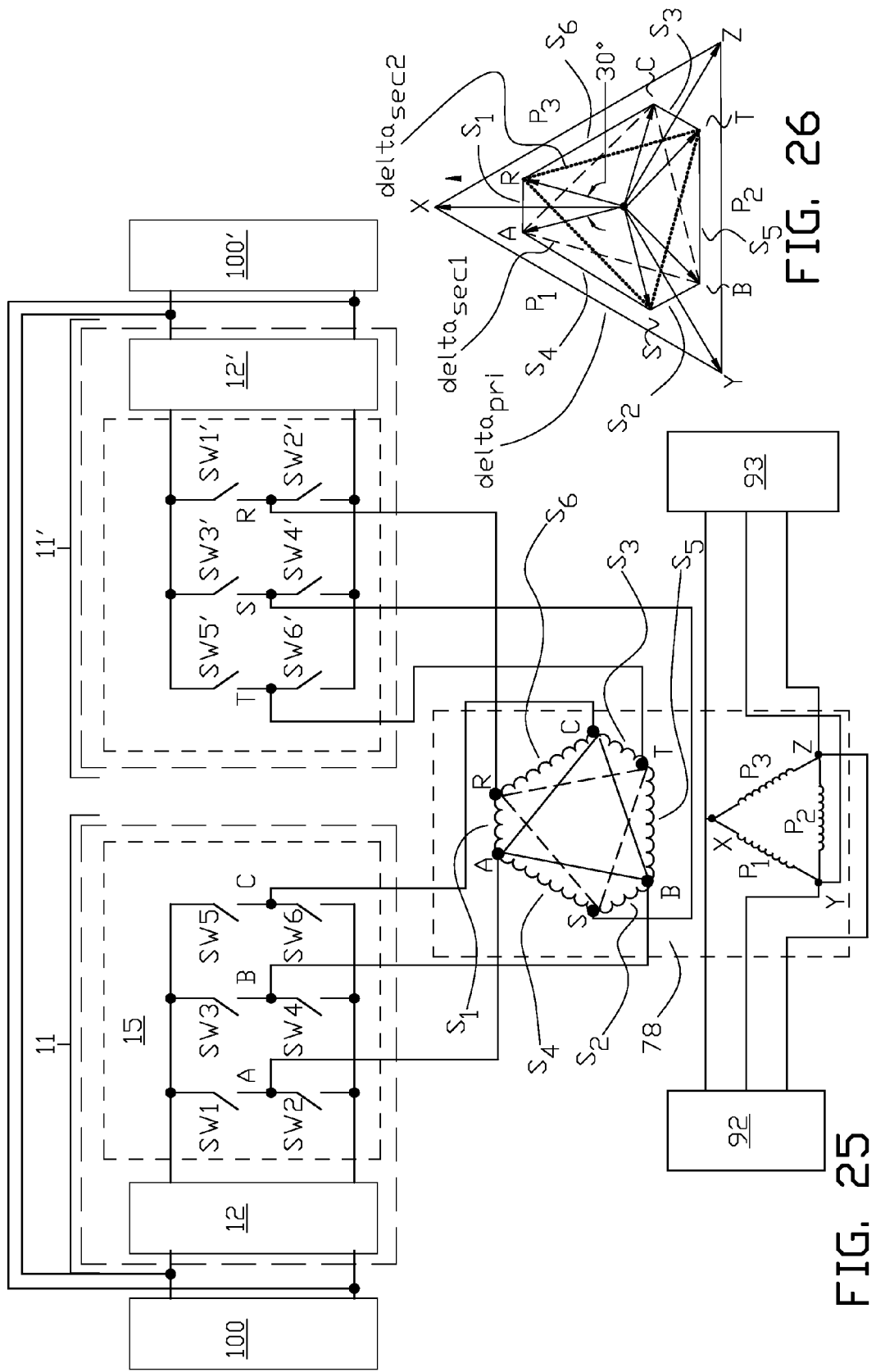
FIG. 25 is a simplified schematic diagram of one example of a six phase regulated current source inverter system of the present invention utilizing double polygon, delta-configured transformation of output power.
FIG. 26 is a vector group diagram illustrating relationships of transformation voltages for the six phase regulated current source inverter system shown in FIG. 25.

FIG. 25 illustrates another example of a multiphase grid synchronized regulated current source inverter system of the present invention wherein a six phase RCSI system comprises two, three phase regulated current source inverters 11 and 11', with output phases A, B and C, and R, S and T, respectively, connected to double delta polygon secondary windings of transformer 78, which has delta-configured primary windings. First three phase RCSI 11 comprises dc current regulator section 12 and three phase inverter section 15, with plurality of dc sources 100 providing input dc power to RCSI 11. Similarly second three phase RCSI 11' comprises dc current regulator section 12' and three phase inverter section 15', with plurality of dc sources 100' providing input dc power to the RCSI 11'. In order to achieve balanced dc voltage input to both inverters, the outputs of dc sources 100 and 100' are connected together in parallel as shown in FIG. 25. The delta-configured primary windings of transformer 78 are connected to three phase grid 92 and loads 93 similar to that described above relative to FIG. 9, including the optional addition of active line filters. Each three phase RCSI utilized in the six phase double delta polygon transformation RCSI system of the present invention may be similar to the three phase RCSI shown in FIG. 9.

The vector group diagram in FIG. 26 illustrates voltages established in the corresponding windings of transformer 78. Inverter 15 output voltage phases A, B and C form a delta configuration between phases as identified by $delta_{sec1}$ (dashed lines in FIG. 26); and inverter 15' output voltage phases R, S and T form a delta configuration between phases as identified by $delta_{sec2}$ (dotted lines in FIG. 26). As illustrated in FIG. 26 $delta_{sec1}$ lags the primary delta configuration, $delta_{pri}$ formed by grid phase voltages X, Y and Z by 15 degrees, and $delta_{sec2}$ leads $delta_{pri}$ by 15 degrees. Therefore inverter 11 output phase voltages lag corresponding grid phase voltages by 15 degrees and inverter 11' output phase voltages lead corresponding grid phase voltages by 15 degrees.

Regarding winding arrangements for transformer 78, secondary long (large number of winding turns) winding $S_4$ and short (small number of winding turns) winding $S_3$ are parallel to primary winding $P_1$ and are all wound on a first common magnetic core stack of the transformer; similarly long winding $S_5$, short winding $S_1$, and winding $P_2$ are all wound on a second common magnetic core stack of the transformer; and long winding $S_6$, short winding $S_2$, and winding $P_3$ are all wound on a third common magnetic core stack of the transformer. The ratio of winding turns between long and short windings is approximately 2.73 to 1.0.

Further evaluation of the vector group shown in FIG. 26 and corresponding windings in FIG. 25 results in the arrangement of common core windings for transformer 78 shown in the following table.

| common core 1 | common core 2 | common core 3 |
| --- | --- | --- |
| $P_1$ | $P_2$ | $P_3$ |
| $S_3$ | $S_1$ | $S_2$ |
| $S_4$ | $S_5$ | $S_6$ |

Figure 27:
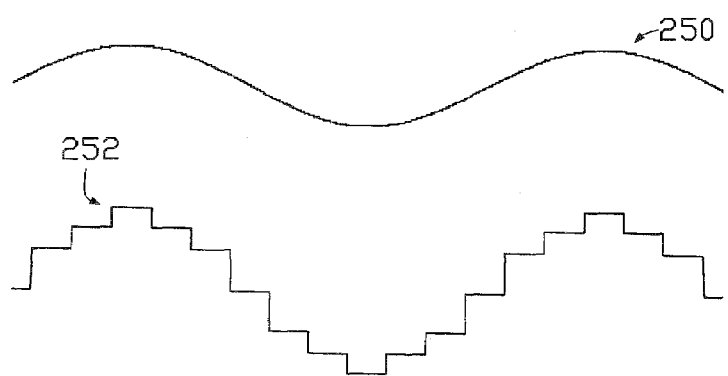
FIG. 27 illustrates waveforms relevant to the operation of the six phase regulated current source inverter shown in FIG. 25.

Control of switches SW1 through SW6 in inverter section 11 are synchronized with phase voltages A, B and C, while the control of switches SW1' through SW6' in inverter section 11' are synchronized with phase voltages R, S and T. The output currents from the pair of inverters are summed and transformed to the primary windings of transformer 78 with no phase shift between the phase voltages and currents to produce current at the output primary terminals of the transformer for injection into the three phase grid. The summed inverter output currents produce current waveform 252 that approaches a pure sine wave. As illustrated by the waveforms in FIG. 27 there is no phase shift between phase voltage waveform 250 and phase current waveform 252 at the output primary terminals X, Y and Z of polygon transformer 78.

Figure 28:
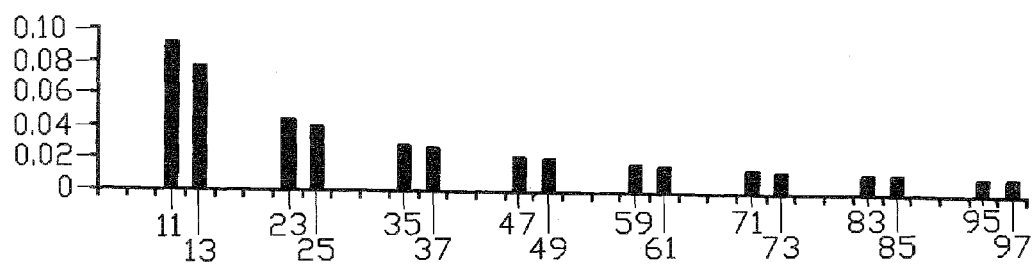
FIG. 28 graphically illustrates magnitudes of ac current harmonics produced at the output of the six phase regulated current source inverter shown in FIG. 25.

The bar chart in FIG. 28 illustrates the distribution of the relative magnitudes of the harmonic content of the current outputted by the six phase RCSI system with double delta polygon secondary and delta primary transformation. The current harmonics are computed using equation (2) with φ equal to 6 and n equal to the series of integers: 11, 13, 23, 25, . . . , 95 and 97, as defined for a six phase RCSI system. The THD value of the six phase RCSI system can be calculated from equation (4) as less than 15 percent.

Applying the inverter switch ratings and system voltages from Example No. 2 above, the power generating capacity of the six phase RCSI system of the present invention shown in FIG. 25 can be calculated as 7.2 megawatts.

Example No. 6

Figures 29, 30:
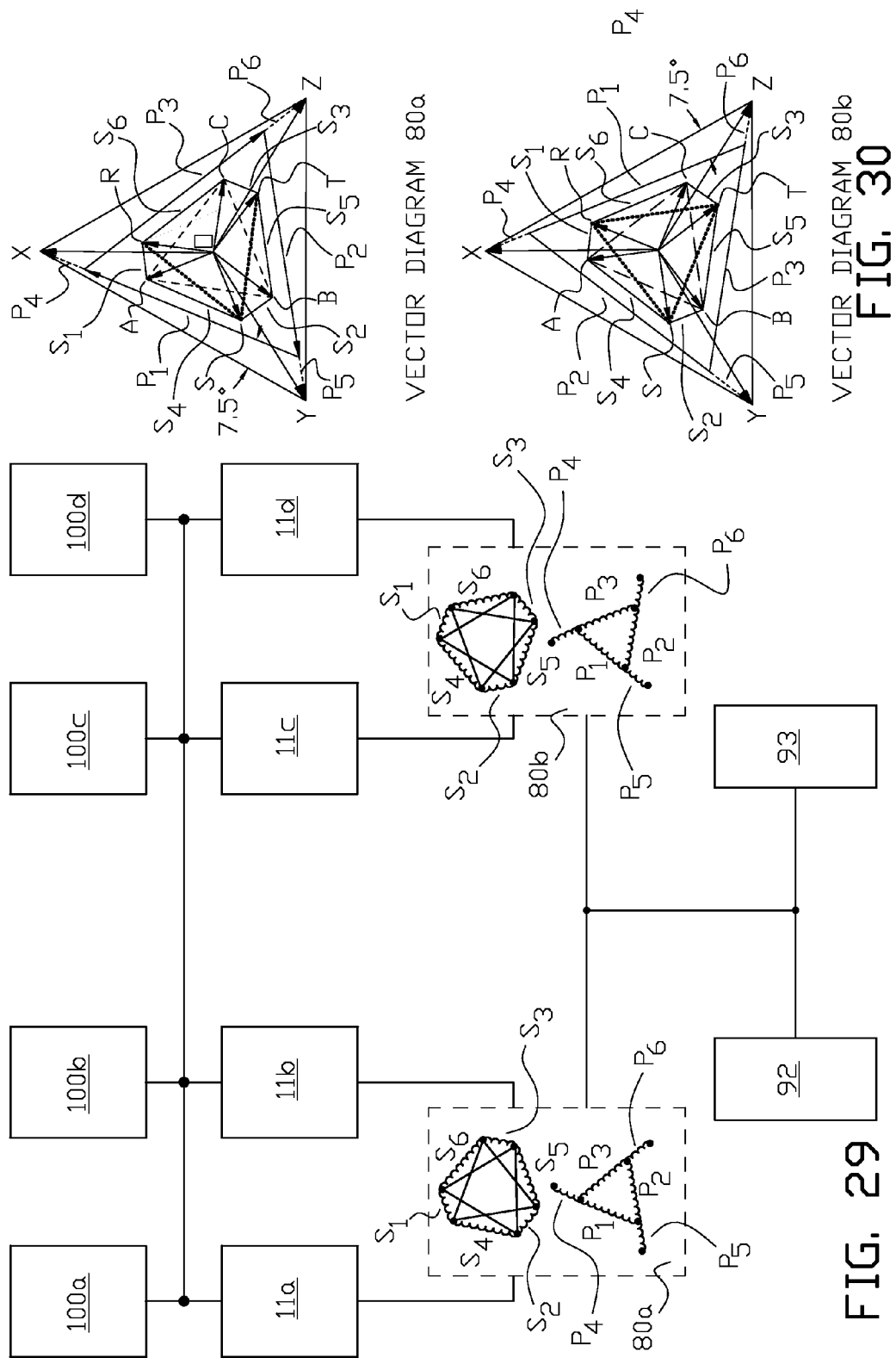
FIG. 29 is a simplified schematic diagram of one example of a twelve phase regulated current source inverter system of the present invention utilizing dual double polygon, extended delta-configured transformation of output power.
FIG. 30 illustrates vector group diagrams showing the relationships of transformation voltages for the twelve phase regulated current source inverter system shown in FIG. 29.

FIG. 29 illustrates another example of a multiphase grid synchronized regulated current source inverter system of the present invention wherein a twelve phase RCSI system comprises two pairs of regulated current source inverters (pair 11a and 11b; and pair 11c and 11d), with the outputs (phase A, B and C; and phase R, S and T) of each pair of inverters connected to the secondary windings of transformer 80a or 80b, which have double delta polygon-configured secondary windings and extended delta-configured primary windings. The twelve phase RCSI system can be used to provide greater output power with a lower THD value than that achieved by the previously described RCSI systems. The twelve phase RCSI system comprises four, three phase regulated current source inverters 11a, 11b, 11c and 11d, each of which may be similar to the three phase RCSI shown in FIG. 9. Plurality of dc sources 100a, 100b, 100c, and 100d are connected to the input of each RCSI as shown in FIG. 29. In order to achieve balanced dc voltage input to all inverters, the outputs of dc sources 100a through 100d are connected together in parallel as shown in FIG. 29. The outputs of inverter pair 11a and 11b are connected to the secondary windings of first six phase transformer 80a, and the outputs of inverter pair 11c and 11d are connected to the secondary windings of second six phase transformer 80b. The primary windings of each transformer are arranged in an extended delta configuration wherein the main primary windings $P_1$, $P_2$ and $P_3$ each have an extended shorter winding with the same phase orientation as the associated main primary winding. The extended delta-configured primary windings of transformers 80a and 80b are connected to three phase grid 92 and loads 93 similar to that described above relative to FIG. 9, including the optional addition of active line filters.

Vector group diagrams 80a and 80b in FIG. 30 illustrate voltages established in the corresponding windings of transformers 80a and 80b respectively. Referring to vector group diagram 80a, vectors $P_1$ and $P_4$ sum to vector X (representing grid phase X voltage). Vector $P_4$ is in phase with vectors $P_1$, $S_3$ and $S_4$, and therefore, corresponding primary windings $P_1$ and $P_4$, and secondary windings $S_3$ and $S_4$ are wound on the same magnetic core stack. The extended end of winding $P_4$ is connected to grid phase X. The ratio of winding turns for winding $P_1$ to winding $P_4$ is selected so that the secondary polygon vectors $S_3$ and $S_4$ lag the grid phase X vector by 7.5 degrees, resulting in a ratio of winding turns of approximately 6.636 to 1.0. Since inverter output phase A is connected to the secondary polygon winding, phase A voltage lags grid phase X voltage by 22.5 degrees. Inverter output phase R voltage leads phase A voltage by 30 degrees, and therefore, leads grid phase voltage X by 7.5 degrees. Therefore inverter output phase voltages A, B and C lag grid phase voltages X, Y and Z, respectively, by 22.5 degrees and inverter output phase voltages R, S and T lead grid phase voltages X, Y and Z, respectively, by 7.5 degrees. Similar analysis of vector group diagram 80b and the windings of transformer 80b reveals that the relationship between inverter output phase voltages A, B and C, and R, S and T of the pair of inverters connected to the secondary windings of transformer 80b is as follows: inverter output phase voltages A, B and C lag grid phase voltages X, Y and Z, respectively, by 7.5 degrees and inverter output phase voltages R, S and T lead grid phase voltages X, Y and Z, respectively, by 22.5 degrees.

Further evaluation of vector group diagram 80a shown in FIG. 30, and corresponding windings in FIG. 29 results in the arrangement of common core windings for transformer 80a shown in the following table.

| common core 1 | common core 2 | common core 3 |
|---|---|---|
| $P_1$ | $P_2$ | $P_3$ |
| $P_4$ | $P_5$ | $P_6$ |
| $S_3$ | $S_1$ | $S_2$ |
| $S_4$ | $S_5$ | $S_6$ |

Further evaluation of vector group diagram 80b shown in FIG. 30, and corresponding windings in FIG. 29 results in the arrangement of common core windings for transformer 80b shown in the following table.

| common core 1 | common core 2 | common core 3 |
|---|---|---|
| $P_1$ | $P_2$ | $P_3$ |
| $P_4$ | $P_5$ | $P_6$ |
| $S_2$ | $S_3$ | $S_1$ |
| $S_6$ | $S_4$ | $S_5$ |

Figure 31:
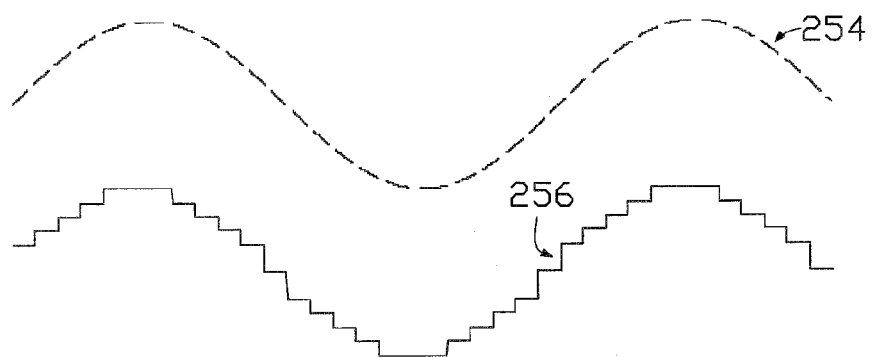
FIG. 31 illustrates waveforms relevant to the operation of the twelve phase regulated current source inverter shown in FIG. 29.

Therefore injected current to each grid phase for each output phase of the twelve phase RCSI system is the summation of four currents, namely currents leading and lagging each grid phase voltage by 7.5 and 22.5 degrees. This twelve phase RCSI system output current waveform 256 is in phase with output voltage waveform 254, and as illustrated in FIG. 31, is a better approximation of a pure sine wave than that achieved in the previous examples of the invention. Therefore the twelve phase grid synchronized RCSI system of the present invention comprising two pairs of three phase regulated current source inverters, with each pair connected to a transformer comprising double delta polygon secondary windings and extended delta-configured primary windings quadruples the magnitude of power that can be injected into the grid in comparison with a three phase RCSI system while reducing the current THD value over that achieved with a three phase RCSI system.

Figure 32:
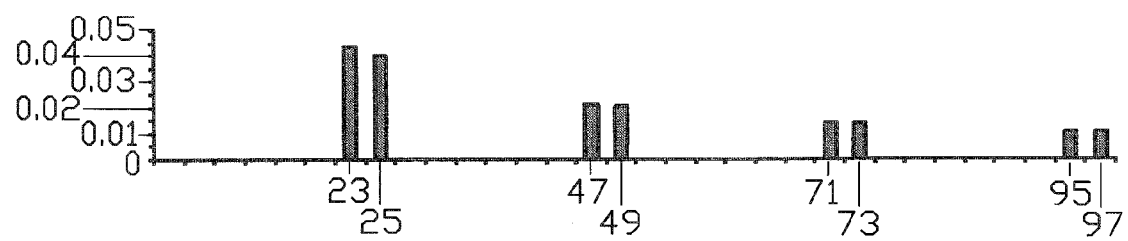
FIG. 32 graphically illustrates magnitudes of ac current harmonics produced at the output of the twelve phase regulated current source inverter shown in FIG. 29.

The bar chart in FIG. 32 illustrates the distribution of the relative magnitudes of the harmonic content of the current outputted by the twelve phase RCSI system with double delta polygon secondary and extended delta primary transformation. The current harmonics are computed using equation (2) with φ equal to 12 and n is equal to the series of integers: 23, 25, 47, 49, 71, 73, 95 and 97, as defined for a twelve phase RCSI system. The THD value of the twelve phase RCSI system can be calculated from equation (4) as less than 7 percent.

Applying the inverter switch ratings and system voltages from Example No. 2 above, the power generating capacity of the twelve phase RCSI system shown in FIG. 29 can be calculated as 14.4 megawatts.

Example No. 7

Figures 33, 34:
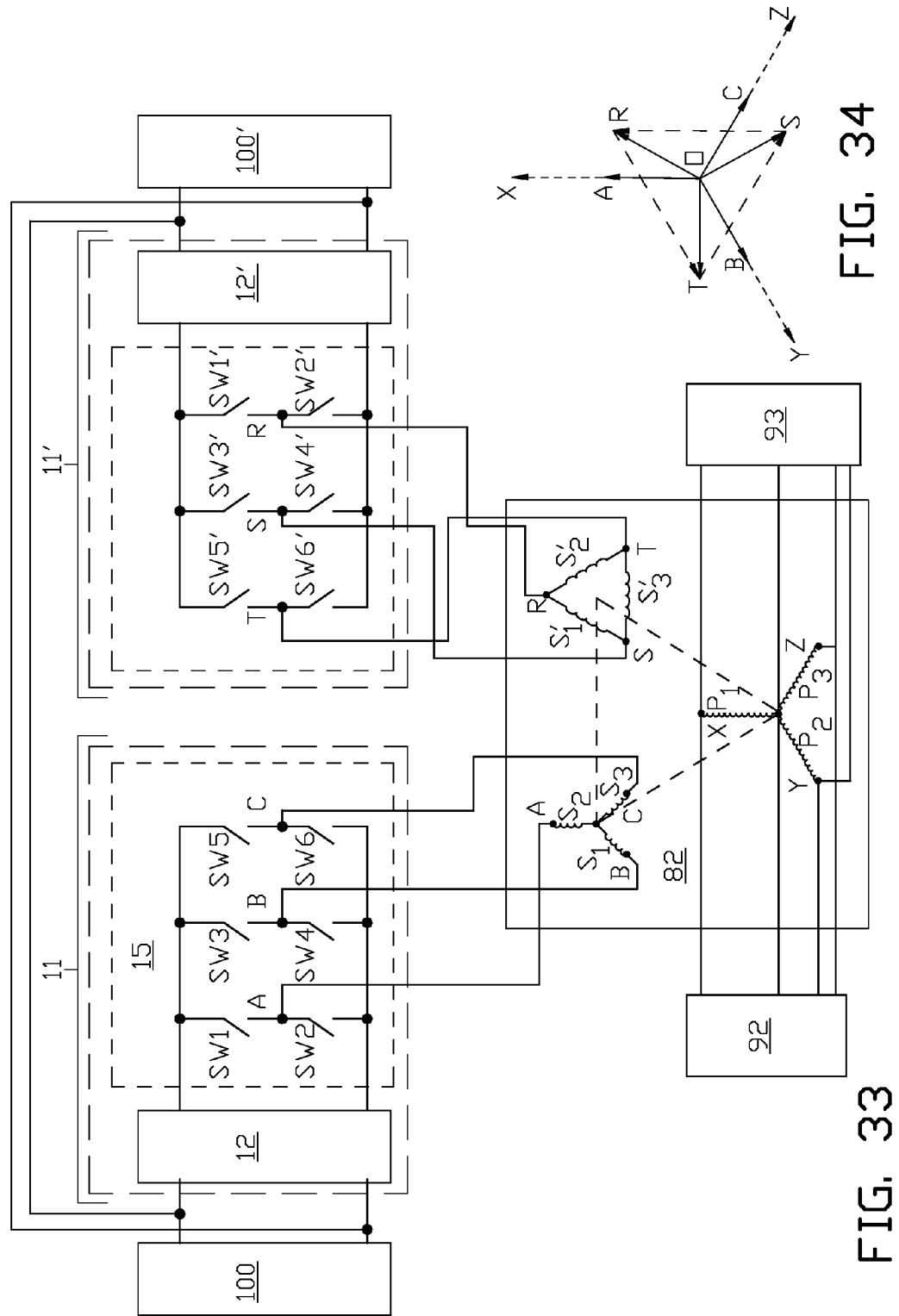
FIG. 33 is a simplified schematic diagram of one example of a six phase regulated current source inverter system of the present invention utilizing wye-delta-configured transformation of output power.
FIG. 34 illustrates a vector group diagram showing the relationships of transformation voltages for the six phase regulated current source inverter system shown in FIG. 33.

FIG. 33 illustrates another example of a multiphase grid synchronized regulated current source inverter system of the present invention wherein a six phase RCSI system comprises two, three phase regulated current source inverters 11 and 11', with output phases A, B and C, and R, S and T, respectively, connected to delta-wye-configured transformer 82. First three phase RCSI 11 comprises dc current regulator section 12 and three phase inverter section 15, with plurality of dc sources 100 providing input dc power to RCSI 11. First three phase RCSI 11 has inverter output phases A, B and C connected to wye-configured secondary transformer windings $S_1$, $S_2$ and $S_3$, respectively. Similarly second three phase RCSI 11' comprises dc current regulator section 12' and three phase inverter section 15', with plurality of dc sources 100' providing input dc power to the RCSI 11'. In order to achieve balanced dc voltage input to both inverters, the outputs of dc sources 100 and 100' are connected together in parallel as shown in FIG. 33. Second three phase RCSI 11' has inverter output phases R, S and T connected to delta-configured secondary transformer windings $S'_1$, $S'_2$ and $S'_3$, respectively. The wye-configured primary windings of transformer 82 are connected to three phase grid 92 and loads 93 similar to that described above relative to FIG. 9, including the optional addition of active line filters. Each three phase RCSI may be similar to the three phase RCSI shown in FIG. 9.

The vector group diagram in FIG. 34 illustrates voltages established in the corresponding windings of transformer 82. Vector X, which represents grid phase X voltage is in phase with vector A, which represents inverter output phase A voltage, and is also in phase with vector RS, which represents transformer line voltage RS. Therefore transformer windings $P_1$, $S_1$ and $S_1'$ are wound on the same magnetic core stack. Similarly: vector Y, which represents grid phase Y voltage is in phase with vector B, which represents inverter output phase B voltage, and is also in phase with vector RT, which represents transformer line voltage RT; and vector Z, which represents grid phase Z voltage is in phase with vector C, which represents inverter output phase C voltage, and is also in phase with vector ST, which represents transformer line voltage ST. Therefore transformer windings $P_2$, $S_2$ and $S_2'$ are wound on the same magnetic core stack, and windings $P_3$, $S_3$ and $S_3'$, are wound on the same magnetic core stack. Consequently transformer phase voltages R, S and T lead grid phase voltages X, Y and Z, respectively by 30 degrees, and also lead transformer phase voltages A, B and C, respectively, by 30 degrees.

Further evaluation of the vector group shown in FIG. 34 and corresponding windings in FIG. 33 results in the arrangement of common core windings for transformer 82 shown in the following table.

| common core 1 | common core 2 | common core 3 |
|---|---|---|
| $P_1$ | $P_2$ | $P_3$ |
| $S_1$ | $S_2$ | $S_3$ |
| $S_1'$ | $S_2'$ | $S_3'$ |

Figure 35:
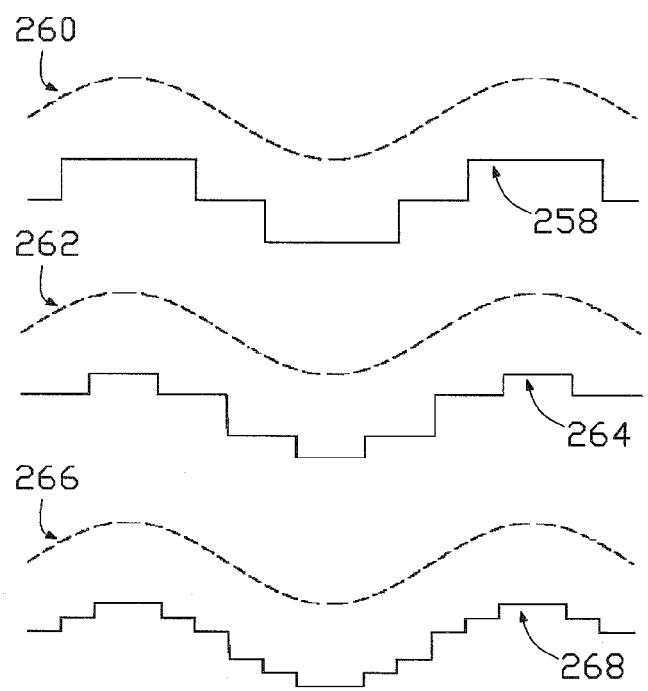
FIG. 35 illustrates waveforms relevant to the operation of the six phase regulated current source inverter shown in FIG. 33.

FIG. 35 illustrates the ac voltage and current waveforms for the six phase RCSI system shown in FIG. 33. Inverter phase A, B or C output current waveform 258 is in phase with corresponding phase voltage A, B or C, respectively, as represented by waveform 260. Transformer line RS, ST or TR current waveform 264 is in phase with corresponding line voltage RS, ST or TR, respectively, as represented by waveform 262. The step-shaped current waveforms 258 and 264 in the secondary windings of transformer 82 are summed and transformed into the primary windings of transformer 82 to produce resultant current waveform 268, which is injected into each of the grid phases, in synchronization with the respective grid phase. Summation of the two three phase inverter output current waveforms 258 and 264 results in injected current waveform 268 with a step-shaped that more closely approximates a pure sine wave.

Figure 36:
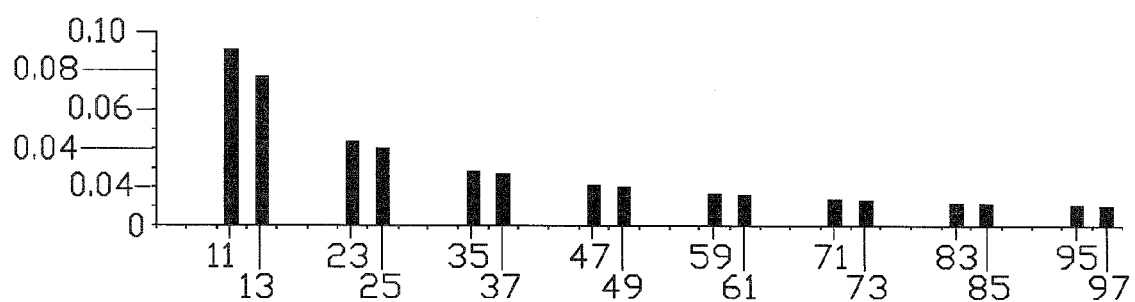
FIG. 36 graphically illustrates magnitudes of ac current harmonics produced at the output of the six phase regulated current source inverter shown in FIG. 33.

The bar chart in the FIG. 36 illustrates the distribution of the relative magnitudes of the harmonic content of the current outputted by the six phase RCSI system with wye-delta transformation. The current harmonics are computed using equation (2) with φ equal to 6 and n equal to 11, 13, 23, 25, ..., 95 and 97, as defined for a six phase RCSI system. The THD value of the six phase RCSI system can be calculated from equation (4) as less than 15 percent.

Applying the inverter switch ratings and system voltages from Example No. 2 above, the power generating capacity of the six phase RCSI system shown in FIG. 33 can be calculated as 7.2 megawatts.

Example No. 8

FIG. 37 illustrates another example of a multiphase grid synchronized regulated current source inverter system of the present invention wherein a twelve phase RCSI system comprises two pairs of regulated current source inverters (pair 11a and 11b; and pair 11c and 11d), with the outputs (phase A, B and C; and phase R, S and T) of each pair of inverters connected to the secondary wye or delta configured windings of transformer 84a or 84b, respectively. The primary windings of each transformer are configured as a zigzag wye. The twelve phase RCSI system comprises four, three phase regulated current source inverters 11a, 11b, 11c and 11d, each of which may be similar to the three phase RCSI shown in FIG. 9. Plurality of dc sources 100a, 100b, 100c, and 100d are connected to the input of each RCSI as shown in FIG. 37. In order to achieve balanced dc voltage input to all inverters, the outputs of plurality of dc sources 100a through 100d are connected together in parallel as shown in FIG. 37. The outputs of inverter pair 11a and 11b are connected to the secondary windings of first six phase transformer 84a, and the outputs of inverter pair 11c and 11d are connected to the secondary windings of second six phase transformer 84b. The primary windings of each transformer are arranged in a zigzag configuration wherein each main primary winding, $P_1$, $P_2$ and $P_3$, has an extended shorter winding with different phase orientation than that of the associated main primary winding.

Vector group diagrams 84a and 84b in FIG. 38 illustrate voltages established in the corresponding windings of transformers 84a and 84b respectively. Referring to vector group diagram 84b, vectors $P_1$ and $P_4$ sum to vector X (representing grid phase X voltage). Vector $P_4$ is 180 degrees out of phase with vector $P_3$ and therefore, corresponding windings $P_3$ and $P_4$ are counterwound on the same magnetic core stack. The ratio of winding turns for winding $P_1$ to winding $P_4$ is approximately 4.92 to 1.0 so that vector $P_1$ leads vector X by 7.5 degrees. Since inverter output phase A voltage (represented by vector A) is synchronized with voltage vector $P_1$, phase A voltage vector also leads vector X by 7.5 degrees. Vector R leads vector A by 30 degrees, and therefore leads grid vector X by 37.5 degrees. Similarly phase B voltage vector leads vector Y by 7.5 degrees; vector S leads grid vector Y by 37.5 degrees; and phase C voltage vector leads vector Z by 7.5 degrees; vector T leads grid vector Z by 37.5 degrees.

Further evaluation of the vector group shown in vector diagram 84b of FIG. 38, and corresponding windings in FIG. 37 results in the arrangement of common core windings for transformer 84b shown in the following table.

| common core 1 | common core 2 | common core 3 |
|---|---|---|
| $P_1$ | $P_2$ | $P_3$ |
| $P_5$ | $P_6$ | $P_4$ |
| $S_1$ | $S_2$ | $S_3$ |
| $S_1'$ | $S_2'$ | $S_3'$ |

Referring to vector group diagram 84a, which corresponds to transformer 84a, the summation of vectors $P_1$ and $P_4$ result in output phases A, B and C of inverter 11a lag grid phases X, Y and Z, respectively by 7.5 degrees. Output phases R, S and T of inverter 11b lead grid phases X, Y and Z, respectively by 37.5 degrees.

Further evaluation of the vector group shown in vector diagram 84a of FIG. 38, and corresponding windings in FIG. 37 results in the arrangement of common core windings for transformer 84a shown in the following table.

| common core 1 | common core 2 | common core 3 |
|---|---|---|
| $P_1$ | $P_2$ | $P_3$ |
| $P_6$ | $P_4$ | $P_5$ |
| $S_1$ | $S_2$ | $S_3$ |
| $S_1'$ | $S_2'$ | $S_3'$ |

Figure 39:
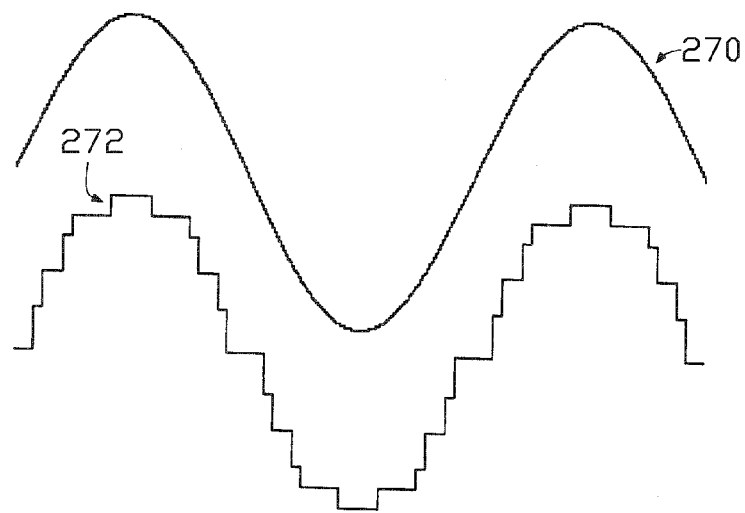
FIG. 39 illustrates waveforms relevant to the operation of the twelve phase regulated current source inverter shown in FIG. 37.

Therefore injected current to each grid phase for each output phase of the twelve phase RCSI system shown in FIG. 37 is the summation of four currents, namely currents leading each grid phase voltage by 7.5, 22.5 and 37.5 degrees and lagging by 7.5 degrees. This twelve phase RCSI system output current waveform 272 is in phase with output voltage waveform 270, and as illustrated in FIG. 39, is a better approximation of a pure sine wave. Therefore the twelve phase grid synchronized RCSI system of the present invention comprising two pairs of three phase regulated current source inverters, with each pair connected to a zigzag wye-configured transformer having branched wye-configured secondary windings quadruples the magnitude of power that can be injected into the grid while reducing the current THD value over that achieved with a three phase RCSI system.

Waveforms 270 and 272 in FIG. 39 illustrate output phase voltage and current for the twelve-phase RCSI system shown in FIG. 37.

Figure 40:
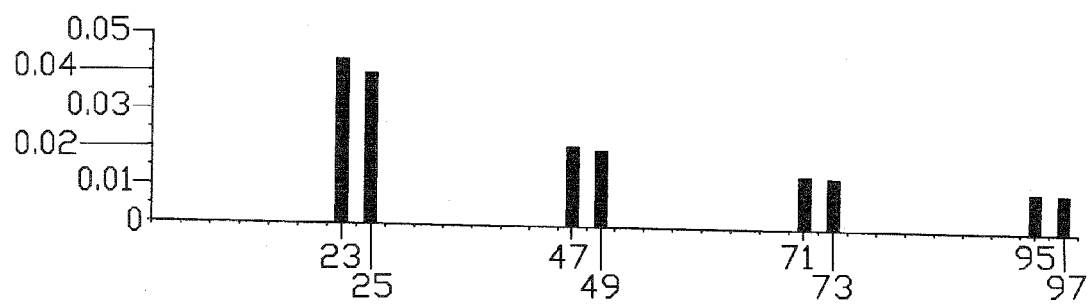
FIG. 40 graphically illustrates magnitudes of ac current harmonics produced at the output of the twelve phase regulated current source inverter shown in FIG. 37.

The bar chart in FIG. 40 illustrates the distribution of the relative magnitudes of the harmonic content of the current outputted by the twelve phase RCSI system shown in FIG. 37. The current harmonics are computed using equation (2) with φ equal to 12 and n is equal to the series of integers: 23, 25, 47, 49, 71, 73, 95 and 97, as defined for a twelve phase RCSI system. The THD value of the twelve phase RCSI system shown in FIG. 37 can be calculated from equation (4) as 7 percent.

Applying the inverter switch ratings and system voltages from Example No. 2 above, the power generating capacity of the twelve phase RCSI system shown in FIG. 37 can be calculated as 14.4 megawatts.

Example No. 9

Figure 41:
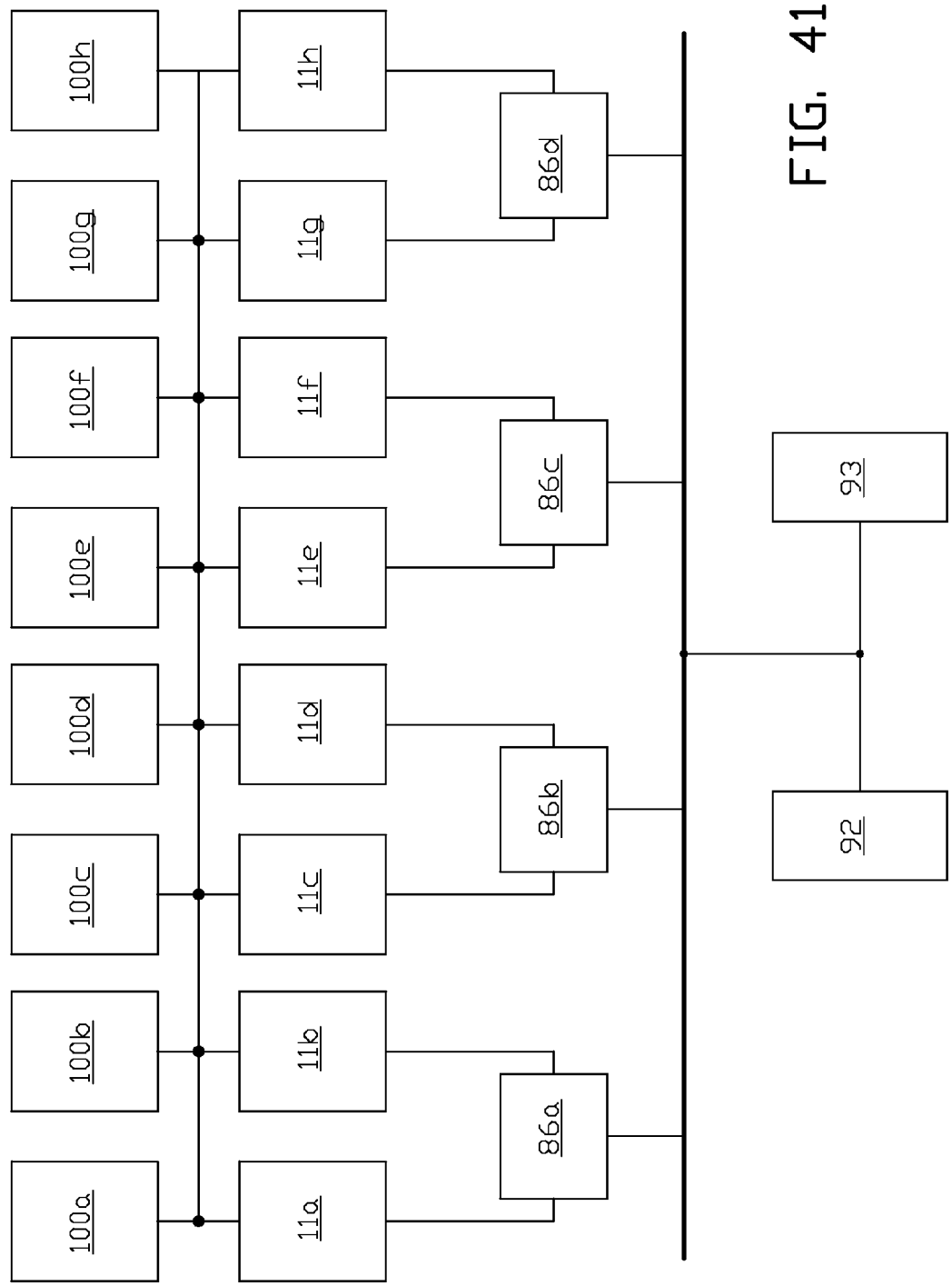
FIG. 41 is a simplified schematic diagram of one example of a twenty-four phase regulated current source inverter system of the present invention utilizing quadruple phase shifted transformation of output power.

FIG. 41 illustrates another example of a multiphase grid synchronized regulated current inverter system of the present invention wherein a twenty-four phase RCSI system comprises four pairs of regulated current source inverters (pair 11a and 11b; pair 11c and 11d; pair 11e and 11f; and pair 11g and 11h), with the outputs of each pair of inverters connected to the secondary windings of transformer 86a, 86b, 86c or 86d, as shown in the figure. The twenty-four phase RCSI system provides greater power out with a lower THD value than any of the previously described RCSI systems. Each transformer may be arranged with secondary windings configured as branched wye, polygon truncated delta or delta-wye as previously described above. The primary windings of each transformer may be configured either as zigzag Y or extended delta, with appropriate phase shifts, as described above. The twenty-four phase RCSI system comprises eight, three phase regulated current source inverters 11a, 11b, 11c, 11d, 11e, 11f, 11g and 11h, each of which may be similar to the three phase RCSI shown in FIG. 9. Plurality of dc sources 100a, 100b, 100c, 100d, 100e, 100f, 100g and 100h are connected to the input of each RCSI. In order to achieve balanced dc voltage input to all inverters, the outputs of dc sources 100a through 100h are connected together in parallel as shown in FIG. 41. The outputs of inverter pair 11a and 11b are connected to the secondary windings of first six phase transformer 86a; the outputs of inverter pair 11c and 11d are connected to the secondary windings of second six phase transformer 86b; the outputs of inverter pair 11e and 11f are connected to the secondary windings of third six phase transformer 86c; and the outputs of inverter pair 11g and 11h are connected to the secondary windings of fourth six phase transformer 86d.

Figure 42:
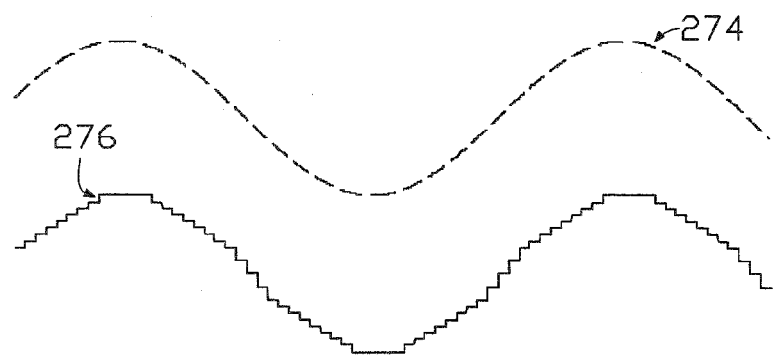
FIG. 42 illustrates waveforms relevant to the operation of the twenty-four phase regulated current source inverter shown in FIG. 41.

Resultant summed current outputted from the primaries of the four transformers is injected into grid 92 to supply power to loads 93. Each resultant transformer primary output phase voltage waveform 274 and phase current waveform 276 is illustrated in FIG. 42.

Figure 43:
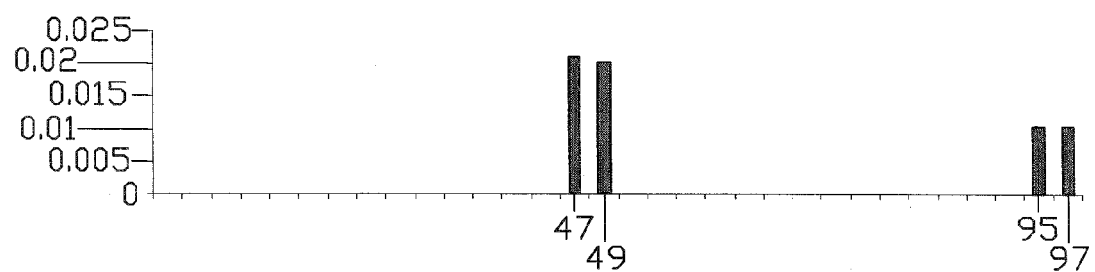
FIG. 43 graphically illustrates magnitudes of ac current harmonics produced at the output of the twenty-four phase regulated current source inverter shown in FIG. 41.

The bar chart in FIG. 43 illustrates the distribution of the relative magnitudes of the harmonic content of the current generated by the twenty-four phase RCSI. The harmonics are computed using equation (2) with $\phi$ equal to 24 and n equal to the series of integers: 47, 49, 95 and 97, as defined for a twenty-four phase RCSI system. The THD value for the twenty-four phase RCSI system can be computed from equation (4) as approximately 3.5 percent.

Applying the inverter switch ratings and system voltages from Example No. 2 above, the power generating capacity of the twenty-four phase RCSI system shown in FIG. 41 can be calculated as 28.8 megawatts.

Figure 1:
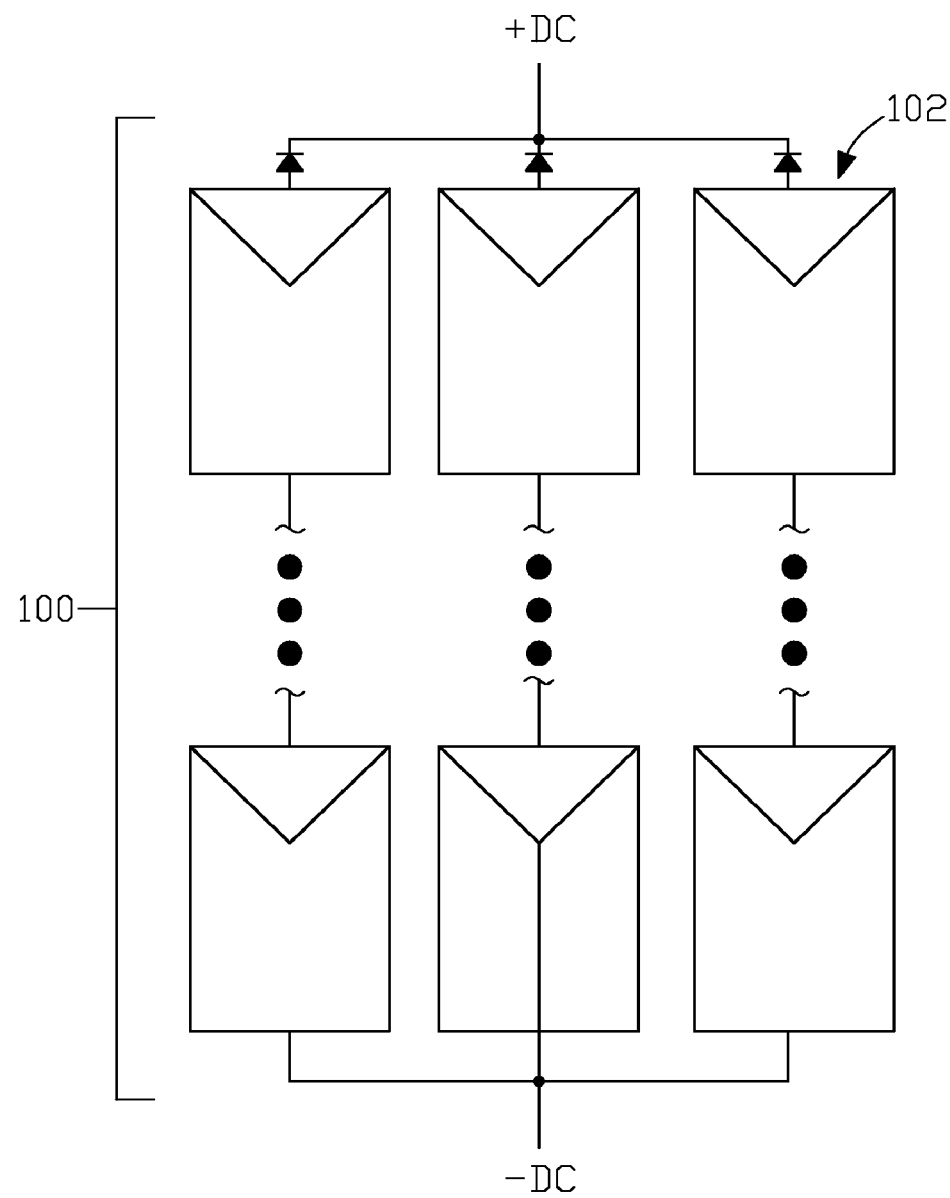
FIG. 1 is a diagrammatic representation of one example of a photovoltaic array comprising a plurality of photovoltaic modules.
Figure 2:
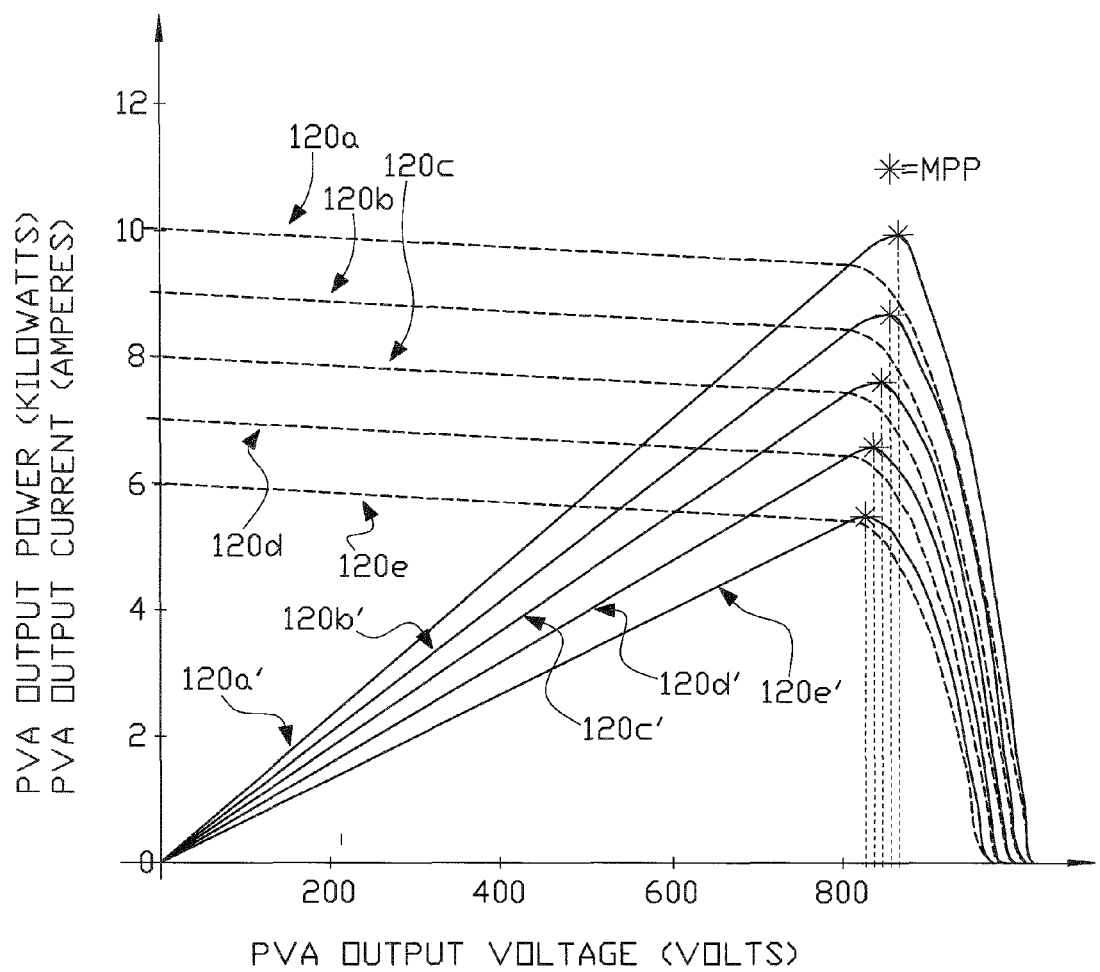
FIG. 2 graphically illustrates the dc output characteristics of a typical photovoltaic array.
Figure 3A:
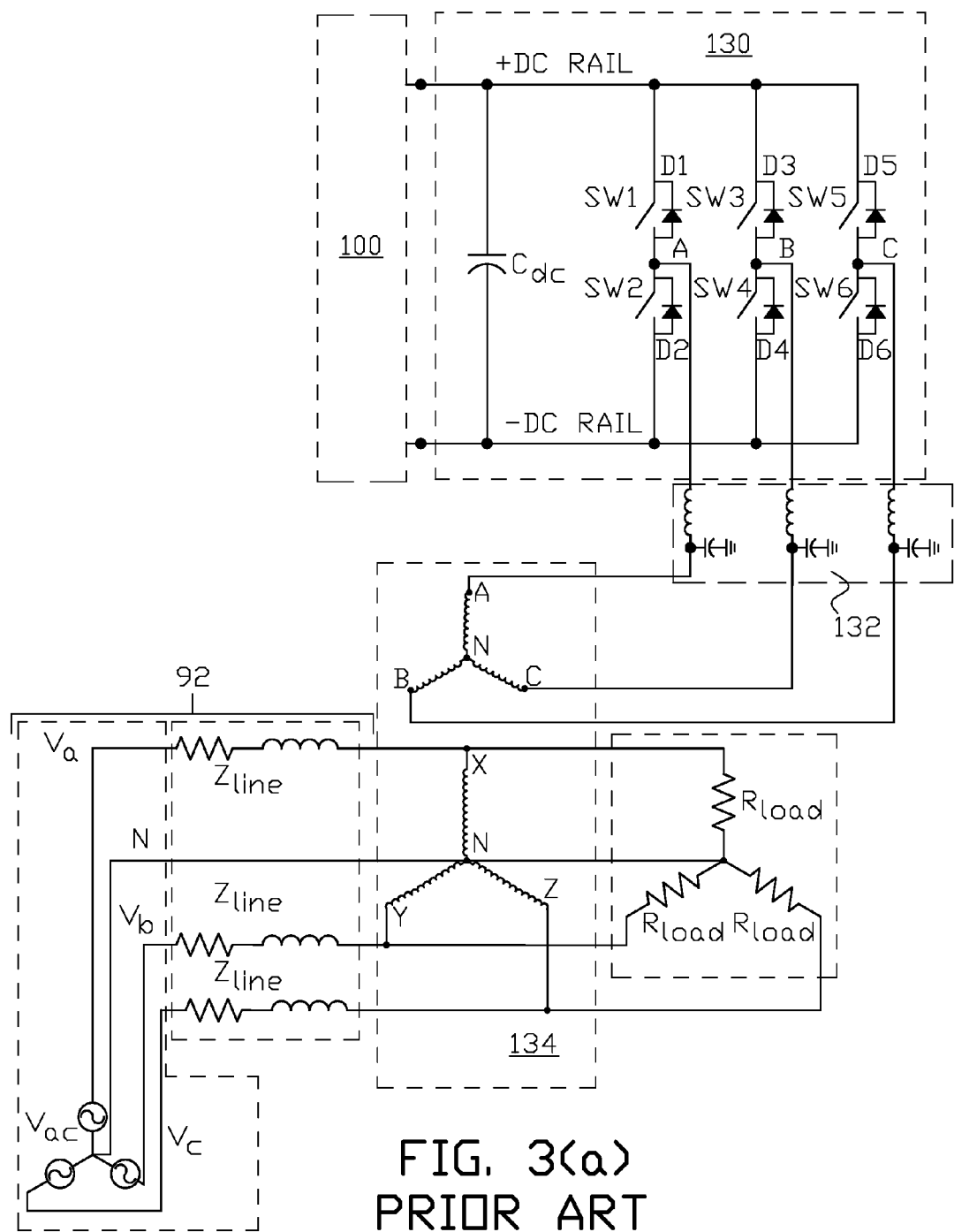
FIG. 3(a) is a schematic diagram of a prior art switch mode voltage source inverter.
Figure 3B:
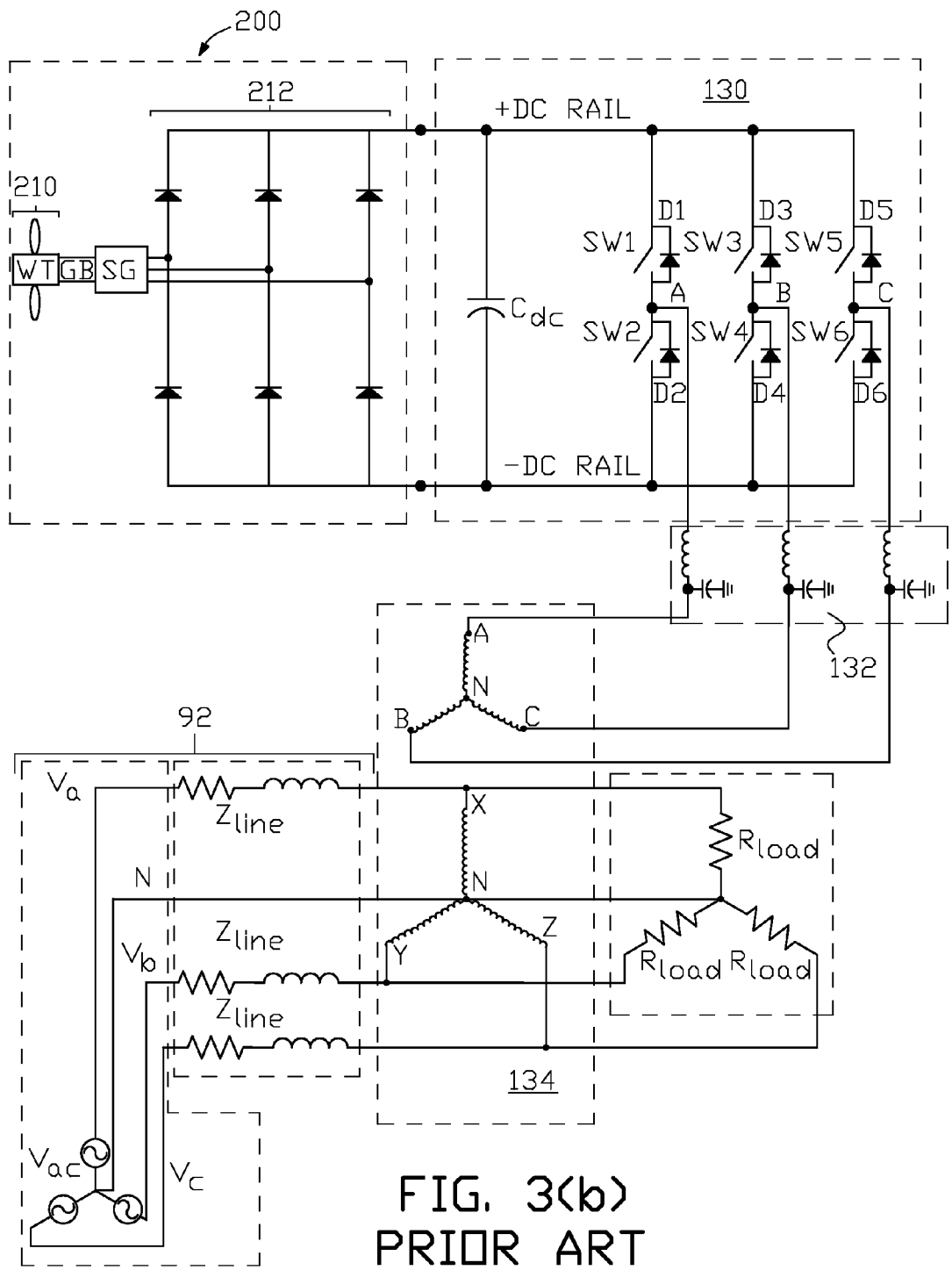
FIG. 3(b) is a schematic diagram of a typical industry designated Type 4 wind turbine driven generator power system.
Figure 4A:
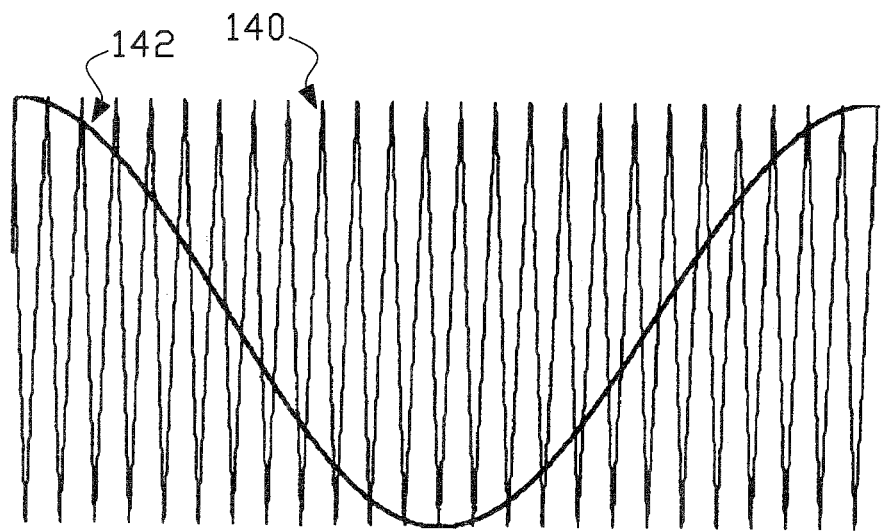
FIG. 4(a), FIG. 4(b) and FIG. 4(c) illustrate waveforms relevant to the operation of the switch mode voltage source inverter shown in FIG. 3(a)
Figure 4B:
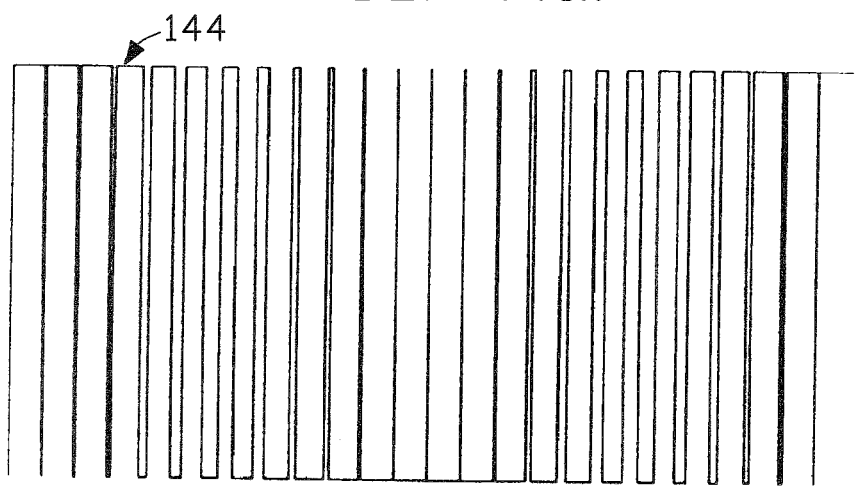
Figure 4C:
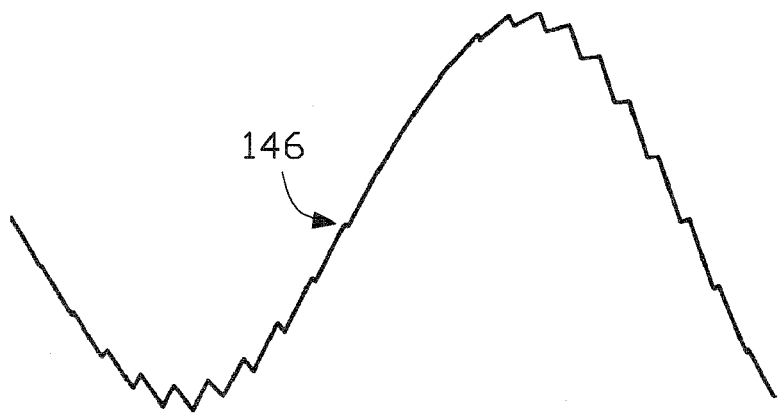
Figure 45:
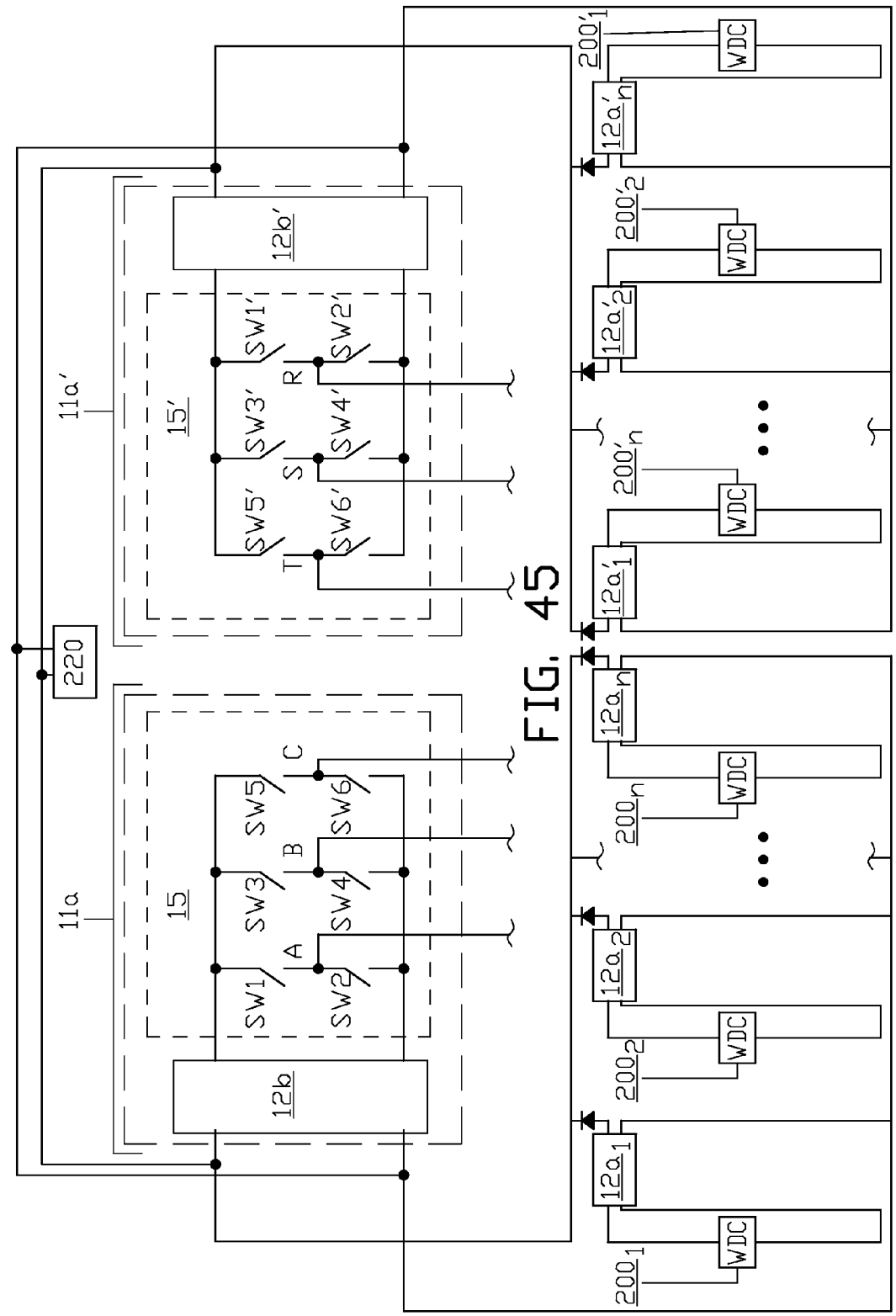
FIG. 45 and FIG. 46 are simplified schematic diagrams of another example of a regulated current source inverter system of the present invention wherein step-up current regulation is accomplished at the plurality of dc sources and all of the dc sources are wind turbine driven generator assemblies.

FIG. 45 is one embodiment of the present invention, similar in arrangement to that shown in FIG. 44, except that the multiple unstable dc sources $200_1$, $200_2$ through $200_n$, and $200'_1$, $200'_2$ through $200'_n$, are wind-generated unstable dc sources (designated "WDC" in FIG. 45). For example each wind-generated unstable dc source shown in the figure may comprise wind turbine WT coupled to generator SG, with the output of the generator rectified to dc via rectifier 212, as shown in FIG. 3(b). While this particular wind turbine driven generator assembly of equipment is used in this embodiment for the wind-generated dc source, other arrangements of wind turbine driven generator assemblies of equipment may also be used. With the arrangement shown in FIG. 45 there is voltage equalization at the dc outputs of each one of the wind-generated dc sources ($200_1$ through $200_n$, and $200_1'$ through $200_n'$) provided by the step-up dc current (boost) regulators ($12a_1$ through $12a_n$, and $12a'_1$ through $12a'_n$).

The alternative embodiment of the invention shown in FIG. 45 can be applied to other examples of the invention disclosed above; that is the photovoltaic dc power sources in the previous examples of the invention may be replaced with wind power-derived dc sources. For example in FIG. 9, FIG. 13, FIG. 17, FIG. 21, FIG. 25, FIG. 29, FIG. 33, FIG. 37, and FIG. 41, the photovoltaic power sources (PVA), or more generally, the dc power sources, may be replaced by wind-generated dc power sources.

Figure 46:
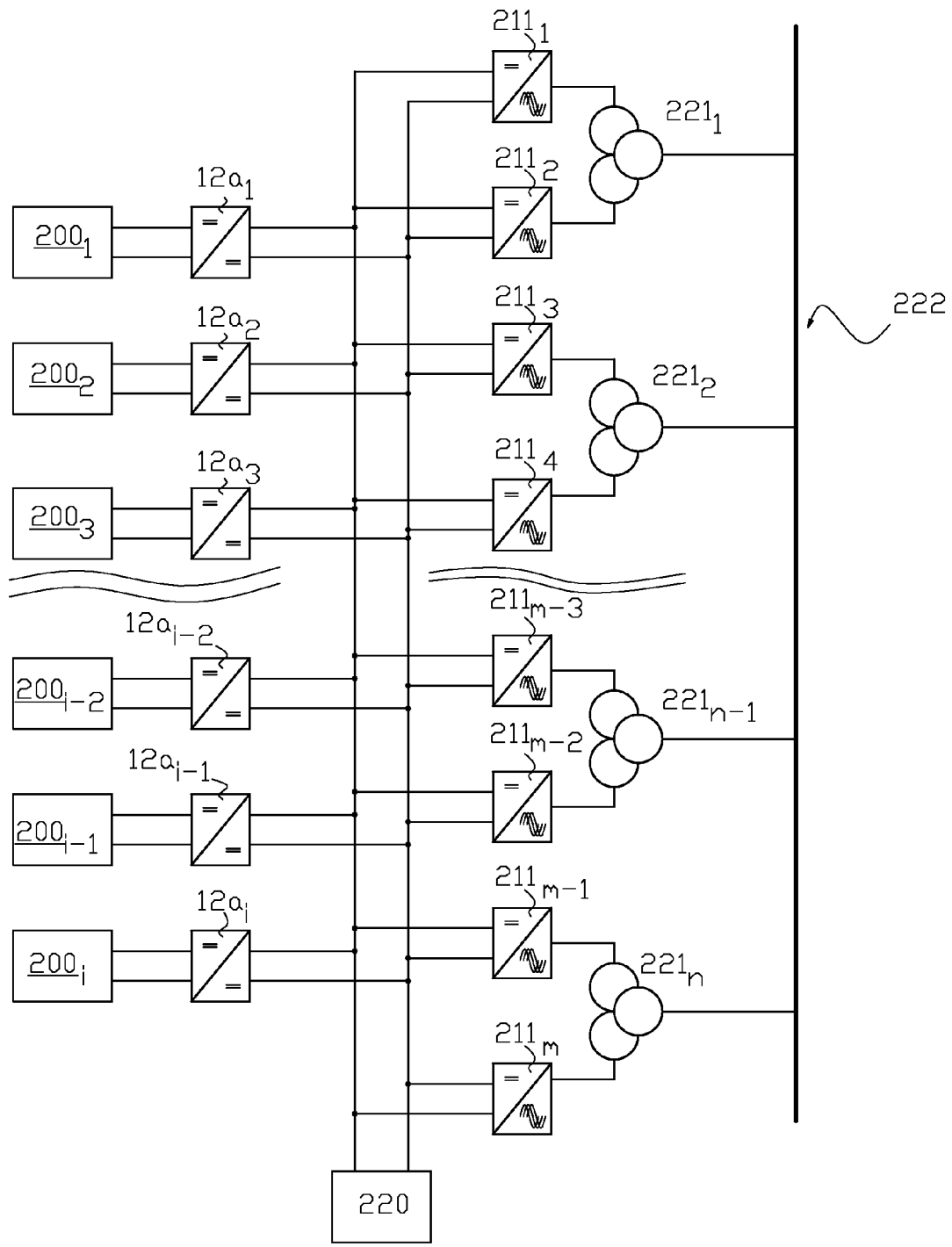

FIG. 46 is a generalized embodiment of the invention shown in FIG. 45 where each wind-generated dc source ($200_1$ through $200_i$) is connected to a dedicated step-up dc current regulator ($12a_1$ through $12a_i$), and the output of each regulator is connected to a common bus with the inputs to modified (as described relative to FIG. 44 above) regulated current source inverters $211_1$ through $211_m$. The outputs of the inverters are connected to grid 222 via any suitable phase shifting transformation network $221_1$ through $221_n$ as described herein.

Figure 47:
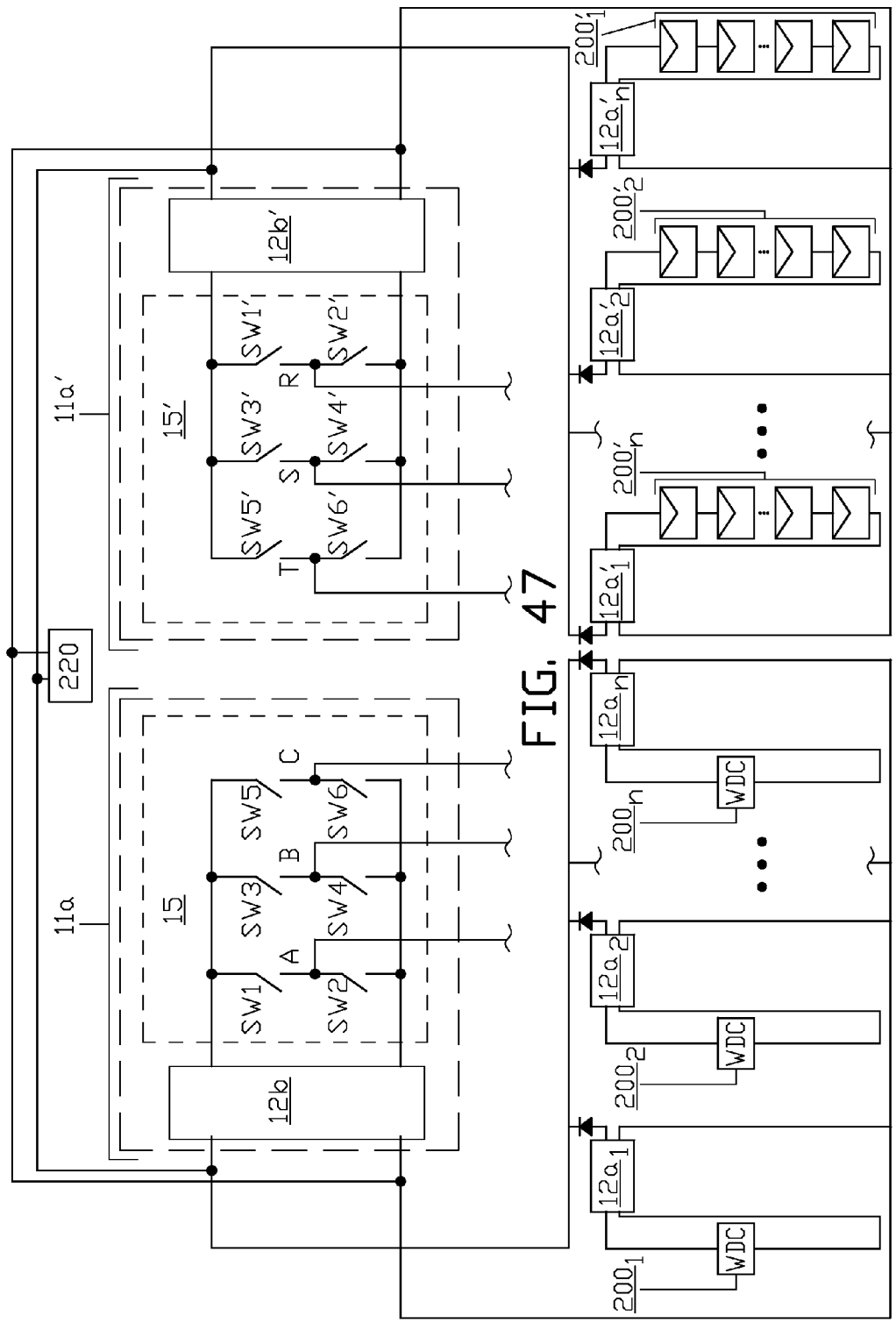
FIG. 47 is a simplified schematic diagram of another example of a regulated current source inverter system of the present invention wherein step-up current regulation is accomplished at the plurality of dc sources, and the dc sources are a combination of wind turbine driven generator assemblies and photovoltaic power sources.

FIG. 47 is another embodiment of the present invention, similar in arrangement to that shown in FIG. 44, except that the multiple unstable dc sources are a mixed combination of wind-generated unstable dc sources and photovoltaic power sources. Each wind-generated dc source ($200_1$ through $200_n$) may be similar to the wind-generated dc sources in FIG. 45 or FIG. 46, and each photovoltaic power source may be similar to PVA $100_1'$ through $100_1'$ as shown in FIG. 44. This embodiment of the invention is of particular value since photovoltaic energy is a sunlight source of power, whereas wind-generated energy is typically a nocturnal peaking source of power. Preferably in this embodiment of the invention the total power output from all wind-generated and photovoltaic-generated power sources is at least 1.5 megawatts.

The alternative embodiment of the invention shown in FIG. 47 can be applied to other examples of the invention disclosed above; that is, at least one of the photovoltaic dc power sources in the previous examples of the invention may be replaced with wind-generated dc source 200. For example in FIG. 9, FIG. 13, FIG. 17, FIG. 21, FIG. 25, FIG. 29, FIG. 33, FIG. 37, and FIG. 41, at least one of the photovoltaic power sources (PVA), or more generally, one or more of the dc power sources may be replaced by a wind-generated dc power source.

In some embodiments of the invention as shown in FIG. 45 and FIG. 47, one or more suitable energy storage devices 220 may be inserted in the dc link between one or more of the outputs of the wind-generated dc sources (and/or the outputs of the photovoltaic sources in FIG. 46) and the inputs to the regulated current source inverters. For example, the storage device may function as a: (1) capacitive; (2) voltaic cell; or (3) fuel cell storage device, or a combination thereof, with a suitable energy transfer control system to either store energy from the dc sources, or supply energy to the dc to ac inverters. Generally reaction time to a system request for energy supply from the storage devices increases in going from (1) capacitive to (3) fuel cell. The capacitive storage device may be, for example, an ultracapacitor. The fuel cell may be a hydrogen fuel cell. A combination of different storage devices, with different energy capacities, may be of benefit in particular applications where the unstable dc sources exhibit a predictable time trended requirement for a particular mix of fast and slow reacting energy storage devices.

In each of the above examples of the invention, each dc current regulator associated with an RCSI functions to achieve MPP tracking for the plurality of photovoltaic dc sources inputted to the RCSI. In addition dc current regulator controls can be interconnected between multiple regulated current source inverters utilized in the same example of the invention to achieve equalization of the dc current inputted to each of the inverters so that harmonic distortion of the three phase output current from the RCSI system that is injected into the grid is minimized.

The salient characteristics of the above non-limiting examples of the invention are summarized in the following table.

| Example No. | RCSI phases | XFR Qty | Transformation (XFR) Secondary | Primary | THD (%) | output power (megawatts) |
|---|---|---|---|---|---|---|
| 1 | 3 | 1 | wye | wye | 30 | 3.6 |
| 2 | 6 | 1 | branched wye | wye | <15 | 7.2 |
| 3 | 9 | 1 | branched wye | wye | <9.5 | 10.8 |
| 4 | 12 | 2 | branched wye | zigzag-wye | <7 | 14.4 |
| 5 | 6 | 1 | double delta polygon | delta | <15 | 7.2 |
| 6 | 12 | 2 | double delta polygon | extended delta | <7 | 14.4 |
| 7 | 6 | 1 | delta-wye | wye | <15 | 7.2 |
| 8 | 12 | 2 | delta-wye | zigzag-wye | 7 | 14.4 |
| 9 | 24 | 4 | (various) | (various) | ≈3.5 | 28.8 |

By connecting any plurality of three phase regulated current source inverters to phase shifting transformers as described above, an RCSI system of the present invention can convent multiple, alternative energy dc power sources into low distortion ac current for supply to a power grid. Increasing the number of utilized three phase regulated current source inverters increases the amount of current that can be supplied to the grid via the phase shifting transformers. Utilizing multiple phase shift arrangements in the transformer windings can further lower the level of harmonic distortion of the supplied power.

The above examples of the invention have been provided merely for the purpose of explanation, and are not to be construed as limiting of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto, and changes may be made without departing from the scope of the invention in its aspects.

The invention claimed is:

1. A power conversion system for converting dc power from a plurality of unstable dc sources to ac power for injection into an electric power grid, the system comprising:
at least one wind-generated power collection node comprising a turbine driven ac generator having a rectified dc output;
a plurality of regulated current source inverters, each one of the plurality of regulated current source inverters having a plurality of switching devices for producing a multiple phase ac output, the rectified dc output of the at least one wind-generated power collection node supplying input power to each one of the plurality of regulated current source inverters, the multiple phase ac output from each one of the plurality of regulated current source inverters operating synchronously with the voltages of the electric power grid, the commutation of the plurality of switching devices in each one of the plurality of regulated current source inverters sequenced to produce a multiple phase ac output currents from each one of the plurality of regulated current source inverters; and
at least one transformer for phase shifting the multiple phase ac output currents from all of the plurality of regulated current source inverters for producing a supply of three-phase currents for injection into the electric power grid, each of the three-phase currents having a multiple stepped waveform, whereby increasing the number of the plurality of regulated current source inverters increases the number of multiple steps in the multiple stepped waveform of each of the three-phase currents and decreases the total harmonic distortion of the three-phase currents.

2. The power conversion system of claim 1 wherein each one of the plurality of regulated current source inverters further comprises the combination of a step-up and step-down pulsed dc current regulator to regulate the multiple phase ac output currents from each one of the plurality of regulated current source inverters in a series of successive regulation periods.

3. The power conversion system of claim 2 further comprising at least one active filter connected to the electric power grid to further decrease the total harmonic distortion of the three-phase currents.

4. The power conversion system of claim 2 wherein each of the series of successive regulation periods is synchronized with the period of the electric power grid and is less than the period of the electric power grid.

5. The power conversion system of claim 1 wherein each one of the plurality of regulated current source inverters further comprises the combination of a step-up and step-down pulsed dc current regulator to regulate the multiple phase ac output currents from each one of the plurality of regulated current source inverters independent of the instantaneous current output level from the at least one wind-generated power collection node.

6. The power conversion system of claim 1 further comprising a step-up pulsed dc current regulator at the rectified dc output of each of the at least one wind-generated power collection node, each one of the plurality of regulated current source inverters further comprising a step-down pulsed dc current regulator to regulate the multiple phase ac output currents from each one of the plurality of regulated current source inverters.

7. The power conversion system of claim 6 further comprising at least one energy storage device connected to the output of the step-up pulsed dc current regulator.

8. The power conversion system of claim 1 wherein the number of the plurality of regulated current source inverters comprises two, and the at least one transformer is a single transformer selected from the group consisting of: branched wye-configured secondary and wye-configured primary windings; double delta polygon configured secondary and delta configured primary windings; and delta-wye configured secondary and wye configured primary windings.

9. The power conversion system of claim 1 wherein the number of the plurality of regulated current source inverters comprises three, and the at least one transformer is a single transformer having branched wye-configured secondary and wye-configured primary windings.

10. The power conversion system of claim 1 wherein the number of the plurality of regulated current source inverters comprises four, and the at least one transformer is a pair of transformers, each one of the pair of transformers is selected from the group consisting of: branched wye-configured secondary and zigzag wye-configured primary windings; and a double delta polygon configured secondary and extended delta configured primary windings, the multiple phase ac output from each one-half of the four regulated current source inverters exclusively connected to the secondary windings of one of the pair of transformers.

11. The power conversion system of claim 1 wherein the number of the plurality of regulated current source inverters comprises twelve, and the at least one transformer is a pair of transformers, each one of the pair of transformers is selected from the group consisting of:
branched wye-configured secondary and zigzag wye-configured primary windings; and double delta polygon configured secondary and extended delta configured primary windings.

12. The power conversion system of claim 1 wherein the number of the plurality of regulated current source inverters comprises eight, and the at least one transformer is a quadruple of phase shifting transformers, the multiple phase ac output from each one quarter of the eight regulated current source inverters exclusively connected to the secondary windings of one of the quadruple of the phase shifting transformers.

13. The power conversion system of claim 1 further comprising at least one solar photovoltaic power collection node comprising a photovoltaic power source having a dc solar power output, the dc solar power output supplying input power to each one of the plurality of regulated current source inverters in parallel with the rectified dc output of the at least one wind-generated power collection node.

14. The power conversion system of claim 13 wherein the photovoltaic power source comprises a photovoltaic array.

15. The power conversion system of claim 13 wherein the total power output of all of the at least one wind-generated power collection node and the at least one solar photovoltaic power collection node is at least 1.5 megawatts.

16. The power conversion system of claim 13 wherein each one of the plurality of regulated current source inverters further comprises the combination of a step-up and step-down pulsed dc current regulator to regulate the multiple phase ac output currents from each one of the plurality of regulated current source inverters in a series of successive regulation periods.

17. The power conversion system of claim 16 further comprising at least one active filter connected to the electric power grid to further decrease the total harmonic distortion of the three phase currents.

18. The power conversion system of claim 16 wherein each of the series of successive regulation periods is synchronized with the period of the electric power grid and is less than the period of the electric power grid.

19. The power conversion system of claim 13 wherein each one of the plurality of regulated current source inverters further comprises the combination of a step-up and step-down pulsed dc current regulator to regulate the multiple phase ac output currents from each one of the plurality of regulated current source inverters independent of the instantaneous current output level from the at least one wind-generated power collection node and the at least one solar photovoltaic power collection node.

20. The power conversion system of claim 13 wherein the number of the plurality of regulated current source inverters comprises two, and the at least one transformer is a single transformer selected from the group consisting of: branched wye-configured secondary and wye-configured primary windings; double delta polygon configured secondary and delta configured primary windings, and delta-wye configured secondary and wye configured primary windings.

21. The power conversion system of claim 13 wherein the number of the plurality of regulated current source inverters comprises three, and the at least one transformer is a single transformer having branched wye-configured secondary and wye-configured primary windings.

22. The power conversion system of claim 13 wherein the number of the plurality of regulated current source inverters comprises four, and the at least one transformer is a pair of transformers, each one of the pair of transformers is selected from the group consisting of: branched wye-configured secondary and zigzag wye-configured primary windings; and a double delta polygon configured secondary and extended delta configured primary windings, the multiple phase ac output from each one half of the four regulated current source inverters exclusively connected to the secondary windings of one of the pair of transformers.

23. The power conversion system of claim 13 wherein the number of the plurality of regulated current source inverters comprises twelve, and the at least one transformer is a pair of transformers, each one of the pair of transformers is selected from the group consisting of:
branched wye-configured secondary and zigzag wye-configured primary windings; and
double delta polygon configured secondary and extended delta configured primary windings.

24. The power conversion system of claim 13 wherein the number of the plurality of regulated current source inverters comprises eight, and the at least one transformer is a quadruple of phase shifting transformers, the multiple phase ac output from each one quarter of the eight regulated current source inverters exclusively connected to the secondary windings of one of the quadruple of the phase shifting transformers.

25. A method of converting dc power from a plurality of unstable dc sources for injection into an electric power grid, the method comprising the steps of:
supplying the dc power from at least one wind-generated power collection node having a dc current output;
connecting the dc current output of each of the at least one wind-generated power collection node to a current regulator section in each one of a plurality of regulated current source inverters;
regulating the dc current output of all of the at least one wind-generated power collection node in the current regulator section in each one of the plurality of regulated current source inverters to produce an inverter regulated dc current;
supplying the inverter regulated dc current to an inverter section in each one of the plurality of regulated current source inverters;
sequentially commutating a plurality of switching devices in the inverter section of each one of the plurality of regulated current source inverters to generate a multiple phase output from each one of the plurality of regulated current source inverters, the multiple phase output from each of the plurality of regulated current source inverters out-of-phase with the respective multiple phase outputs of all other of the plurality of regulated current source inverters; and connecting the multiple phase output from each of the plurality of regulated current source inverters to a phase shifting transformation network having a three phase output connected to the electric power grid whereby a three-phase current with each phase having a stepped waveform is injected into the electric power grid.

26. The method of claim 25 wherein the step of regulating the dc current output of all of the at least one wind-generated power collection node further comprises performing a single or multi-pulse step-up or step-down dc current regulation function independent of the instantaneous dc current output of the at least one wind-generated power collection node.

27. The method of claim 26 further comprising the step of synchronizing the period of the single or multi-pulse step-up or step down dc current regulation function to the period of the electric power grid.

28. The method of claim 26 further comprising the step of performing the single or multi-pulse step-up or step-down dc current regulation function to minimize current harmonic content in the three phase output connected to the electric power grid.

29. The method of claim 25 wherein the step of regulating the dc current output of all of the at least one wind-generated power collection node further comprises the step of step-up current regulating the dc current output of the at least one wind-generated power collection node to maintain the dc voltage supplied to each one of the plurality of regulated current source inverters from the at least one wind-generated power collection node at a regulated dc voltage value.

30. The method of claim 29 further comprising the step of storing electrical energy supplied by the at least one wind-generated power collection node at the regulated dc voltage value.

31. The method of claim 30 further comprising the step of injecting the stored electrical energy to the input of each one of the plurality of regulated current source inverters.

32. The method of claim 25 further comprising the steps of:
supplying the dc power from at least one solar photovoltaic power collection node having a dc current output;
connecting the dc current output of each of the at least one solar photovoltaic power collection node to the current regulator section in each one of the plurality of regulated current source inverters in parallel with the dc current output of each one of the at least one wind-generated power collection node; and
regulating the dc current output of all of the at least one solar photovoltaic power collection node in the current regulator section in each one of the plurality of regulated current source inverters in coordination with the step of regulating the dc current output of all of the at least one wind-generated power collection node.

33. A method of injecting a quantity of ac power into an electric power grid from a plurality of unstable dc sources, the method comprising the steps of:

supplying dc power from at least one wind-generated power collection node having a dc current output;
connecting the dc current output of each of the at least one wind-generated power collection node to a current regulator section in each one of a plurality of regulated current source inverters;
regulating the dc current output of all of the at least one wind-generated power collection node in the current regulator section in each one of the plurality of regulated current source inverters to produce an inverter regulated dc current;
supplying the inverter regulated dc current to an inverter section in each one of the plurality of regulated current source inverters;
sequentially commutating a plurality of switching devices in the inverter section of each one of the plurality of regulated current source inverters to generate a multiple phase output from each one of the plurality of regulated current source inverters, the multiple phase output from each of the plurality of regulated current source inverters out-of-phase with the respective multiple phase outputs of all other of the plurality of regulated current source inverters;
connecting the multiple phase output from each of the plurality of regulated current source inverters to a phase shifting transformation network having a three phase output connected to the electric power grid; and
injecting the quantity of ac power comprising the three phase output, with each phase of the three phase output having a stepped waveform, into the electric power grid.

34. The method of claim 33 wherein the step of regulating the dc current output of all of the at least one wind-generated power collection node further comprises performing a single or multi-pulse step-up or step-down dc current regulation function independent of the instantaneous dc current output of the at least one wind-generated power collection node.

35. The method of claim 33 wherein the step of regulating the dc current output of all of the at least one wind-generated power collection node further comprises the step of step-up current regulating the dc current output of the at least one wind-generated power collection node to maintain the dc voltage supplied to each one of the plurality of regulated current source inverters from the at least one wind-generated power collection node at a regulated dc voltage value.

36. The method of claim 33 further comprising the steps of:
supplying the dc power from at least one solar photovoltaic power collection node having a dc current output;
connecting the dc current output of each of the at least one solar photovoltaic power collection node to the current regulator section in each one of a plurality of regulated current source inverters in parallel with the dc current output of each one of the at least one wind-generated power collection node; and
regulating the dc current output of all of the at least one solar photovoltaic power collection node in the current regulator section in each one of the plurality of regulated current source inverters in coordination with the step of regulating the dc current output of all of the at least one wind-generated power collection node.

\* \* \* \* \*